United States Patent
Yang et al.

(10) Patent No.: US 12,426,073 B2
(45) Date of Patent: Sep. 23, 2025

(54) UPLINK CANCELLATION INDICATION RESOURCE DETERMINATION

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/230,507

(22) Filed: Apr. 14, 2021

(65) Prior Publication Data

US 2021/0352673 A1 Nov. 11, 2021

Related U.S. Application Data

(60) Provisional application No. 63/025,903, filed on May 15, 2020, provisional application No. 63/021,021, filed on May 6, 2020.

(51) Int. Cl.
*H04W 72/53* (2023.01)
*H04L 1/00* (2006.01)
(Continued)

(52) U.S. Cl.
CPC ........... *H04W 72/53* (2023.01); *H04L 1/0038* (2013.01); *H04W 24/08* (2013.01); *H04W 72/0446* (2013.01); *H04W 72/21* (2023.01)

(58) Field of Classification Search
CPC ............ H04W 72/0493; H04W 24/08; H04W 72/0413; H04W 72/0446; H04L 1/0038
See application file for complete search history.

(56) References Cited

U.S. PATENT DOCUMENTS

2019/0253137 A1* 8/2019 Sun .................. H04B 7/2643
2019/0306848 A1* 10/2019 Zhou ................ H04W 72/044
(Continued)

FOREIGN PATENT DOCUMENTS

| EP | 3547780 A1 | 10/2019 |
|---|---|---|
| WO | WO-2019160332 A1 | 8/2019 |
| WO | WO-2019195030 A1 | 10/2019 |

OTHER PUBLICATIONS

International Search Report and Written Opinion—PCT/US2021/027560—ISA/EPO—Sep. 1, 2021 (204744WO).
(Continued)

*Primary Examiner* — Faruk Hamza
*Assistant Examiner* — Tito Q Pham
(74) *Attorney, Agent, or Firm* — Guang Y. Zhang; Holland &Hart LLP

(57) ABSTRACT

Methods, systems, and devices for wireless communications are described. A user equipment (UE) may identify a configuration for determining a control channel resource candidate that corresponds to an uplink cancellation indication from a set of control channel resource candidates configured for the UE. The UE may also determine the control channel resource candidate that corresponds to the uplink cancellation indication from the set of control channel resource candidates based on the configuration and may monitor for the uplink cancellation indication in the control channel resource candidate that corresponds to the uplink cancellation indication based on the determining.

30 Claims, 16 Drawing Sheets

(51) Int. Cl.
*H04W 24/08* (2009.01)
*H04W 72/0446* (2023.01)
*H04W 72/21* (2023.01)

(56) References Cited

U.S. PATENT DOCUMENTS

| | | | | |
|---|---|---|---|---|
| 2020/0259601 | A1* | 8/2020 | Zhou | H04W 76/11 |
| 2020/0304230 | A1* | 9/2020 | Papasakellariou | H04L 1/1614 |
| 2020/0314882 | A1* | 10/2020 | Fakoorian | H04L 5/0053 |
| 2020/0344747 | A1* | 10/2020 | Park | H04W 72/1268 |
| 2021/0168783 | A1* | 6/2021 | Islam | H04W 72/23 |
| 2021/0376985 | A1* | 12/2021 | Zhou | H04L 5/0053 |
| 2022/0159683 | A1* | 5/2022 | Islam | H04W 72/1268 |
| 2022/0248410 | A1* | 8/2022 | Lee | H04W 52/14 |
| 2023/0112798 | A1* | 4/2023 | Lee | H04W 76/28 |
| | | | | 370/329 |

OTHER PUBLICATIONS

Qualcomm Incorporated: "Uplink Inter-UE Tx Multiplexing and Prioritization", 3GPP Draft, 3GPP TSG-RAN WG1 #98, R1-1909268, Uplink inter-UE Tx Multiplexing and Prioritization, 3rd Generation Partnership Project (3GPP), Mobile Competence Centre, 650, Route Des Luciols, F-06921 Sophia-Antipolis CE, vol. RAN WG1, No. Prague, Czech Republic, Aug. 26, 2019-Aug. 30, 2019, Aug. 17, 2019 (Aug. 17, 2019), XP051765873, 10 Pages, Retrieved from the Internet: URL: http://www.3gpp.org/ftp/tsg_ran/WG1_RL1/TSGR1_98/Docs/R1-1909268.zip [retrieved on Aug. 17, 2019], Section 2.2, paragraph 3, The whole document.

VIVO: "Summary of UL Inter UE Tx Prioritization for URLLC", 3GPP TSG RAN WG1 #100bis, 3GPP Draft, R1-2001676, 3rd Generation Partnership Project (3GPP), Mobile Competence Centre, 650, Route Des Luciols, F-06921 Sophia-Antipolis Cedex, France, vol. RAN WG1, No. e-Meeting, Apr. 20, 2020-Apr. 30, 2020, Apr. 14, 2020 (Apr. 14, 2020), 25 Pages, XP051876354, Retrieved from the Internet: URL: https://www.3gpp.org/ftp/TSG_RAN/WG1_RL1/TSGR1_100b_e/Docs/R1-2001676.zip, R1-2001676, Summary of UL inter UE Tx prioritization for URLLC.docx [retrieved on Apr. 14, 2020] RAN1#98bis Agreements; p. 19.

VIVO: "Summary#1 of UL Inter UE Tx Prioritization/Multiplexing", 3GPP TSG RAN WG1 #99, 3GPP Draft, R1-1913368, 3rd Generation Partnership Project (3GPP), Mobile Competence Centre, 650, Route Des Luciols, F-06921 Sophia-Antipolis Cedex, France, vol. RAN WG1, No. Reno, USA, Nov. 18, 2019-Nov. 22, 2019, Nov. 25, 2019 (Nov. 25, 2019), XP051830649, Retrieved from the Internet: URL: https://www.3gpp.org/ftp/tsg_ran/WG1_RL1/TSGR1_99/Docs/R1-1913368.zip, R1-1913368 Summary#1 of UL Inter UE Tx Prioritizationmultiplexing-v3.docx, [retrieved on Nov. 25, 2019], Proposal 9; p. 35 Proposal 2-7; p. 36 Proposal 5; p. 38.

* cited by examiner

UPLINK CANCELLATION INDICATION RESOURCE DETERMINATION

CROSS REFERENCE

The present application for patent claims the benefit of U.S. Provisional Patent Application No. 63/021,021 by YANG et al., entitled "UPLINK CANCELLATION INDICATION RESOURCE DETERMINATION," filed May 6, 2020, and the benefit of U.S. Provisional Patent Application No. 63/025,903 by YANG et al., entitled "UPLINK CANCELLATION INDICATION RESOURCE DETERMINATION," filed May 15, 2020, each of which is assigned to the assignee hereof, and each of which is expressly incorporated by reference herein.

FIELD OF TECHNOLOGY

The following relates generally to wireless communications and more specifically to uplink cancellation indication resource determination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink cancellation indication resource determination. Generally, the described techniques provide for a user equipment (UE) to identify a configuration for determining a control channel resource candidate (e.g., a physical downlink control channel (PDCCH) candidate) that corresponds to an uplink cancellation indication (e.g., uplink transmission cancellation indication) from a set of control channel resource candidates configured for the UE. The UE may determine the control channel resource candidate that corresponds to the uplink cancellation indication from the set of control channel resource candidates based on the identified configuration. The UE may monitor for the uplink cancellation indication in the control channel resource candidate that corresponds to the uplink cancellation indication based on determining the control channel resource candidate that corresponds to the uplink cancellation indication.

A method of wireless communications at a UE is described. The method may include identifying a configuration for determining a control channel resource candidate that corresponds to an uplink cancellation indication from a set of control channel resource candidates configured for the UE, determining the control channel resource candidate that corresponds to the uplink cancellation indication from the set of control channel resource candidates based on the configuration, and monitoring for the uplink cancellation indication in the control channel resource candidate that corresponds to the uplink cancellation indication based on the determining.

An apparatus for wireless communications at a UE is described. The apparatus may include a processor, memory coupled with the processor, and instructions stored in the memory. The instructions may be executable by the processor to cause the apparatus to identify a configuration for determining a control channel resource candidate that corresponds to an uplink cancellation indication from a set of control channel resource candidates configured for the UE, determine the control channel resource candidate that corresponds to the uplink cancellation indication from the set of control channel resource candidates based on the configuration, and monitor for the uplink cancellation indication in the control channel resource candidate that corresponds to the uplink cancellation indication based on the determining.

Another apparatus for wireless communications at a UE is described. The apparatus may include means for identifying a configuration for determining a control channel resource candidate that corresponds to an uplink cancellation indication from a set of control channel resource candidates configured for the UE, determining the control channel resource candidate that corresponds to the uplink cancellation indication from the set of control channel resource candidates based on the configuration, and monitoring for the uplink cancellation indication in the control channel resource candidate that corresponds to the uplink cancellation indication based on the determining.

A non-transitory computer-readable medium storing code for wireless communications at a UE is described. The code may include instructions executable by a processor to identify a configuration for determining a control channel resource candidate that corresponds to an uplink cancellation indication from a set of control channel resource candidates configured for the UE, determine the control channel resource candidate that corresponds to the uplink cancellation indication from the set of control channel resource candidates based on the configuration, and monitor for the uplink cancellation indication in the control channel resource candidate that corresponds to the uplink cancellation indication based on the determining.

In some examples of the method, apparatuses, and non-transitory computer-readable medium described herein, identifying the configuration further may include operations, features, means, or instructions for identifying a first configuration indicating that the control channel resource candidate that corresponds to the uplink cancellation indication corresponds to a first control channel resource candidate of the set of control channel resource candidates.

Some examples of the method, apparatuses, and non-transitory computer-readable medium described herein may further include operations, features, means, or instructions for receiving configuration signaling configuring the UE to monitor a search space in a control resource set with a control channel element aggregation level, where the first control channel resource candidate of the set of control channel resource candidates corresponds to the first control channel resource candidate for the aggregation level for the search space in the control resource set.

Some examples of the method, apparatuses, and non-transitory computer-readable medium described herein may further include operations, features, means, or instructions for differentiating between the control channel resource candidate that corresponds to the uplink cancellation indication and a control channel resource candidate that corresponds to a slot format indicator based on a difference in a radio network temporary identifier for the control channel resource candidate that corresponds to the uplink cancellation indication and the control channel resource candidate that corresponds to the slot format indicator.

In some examples of the method, apparatuses, and non-transitory computer-readable medium described herein, identifying the configuration further may include operations, features, means, or instructions for identifying a second configuration indicating that the control channel resource candidate that corresponds to the uplink cancellation indication corresponds to a control channel resource candidate immediately following a control channel resource candidate configured for slot format indicator monitoring.

Some examples of the method, apparatuses, and non-transitory computer-readable medium described herein may further include operations, features, means, or instructions for receiving configuration signaling configuring the UE to monitor for a slot format indicator on a same search space and a same control resource set with a same aggregation level as for monitoring for the uplink cancellation indication.

In some examples of the method, apparatuses, and non-transitory computer-readable medium described herein, identifying the configuration further may include operations, features, means, or instructions for identifying a second configuration indicating that control channel resource candidates configured for slot format indicator monitoring may be configured for a first search space in a first control resource set with a first control channel element aggregation level, where the second configuration further indicates that the control channel resource candidate that corresponds to the uplink cancellation indication may be configured for a second search space, a second control resource set, a second control channel element aggregation level, or a combination thereof, that may be different than the first search space, the first control resource set, and the first control channel element aggregation level.

Some examples of the method, apparatuses, and non-transitory computer-readable medium described herein may further include operations, features, means, or instructions for identifying a third configuration indicating that control channel resource candidates configured for slot format indicator monitoring and the control channel resource candidate that corresponds to the uplink cancellation indication correspond to a different blind detection.

Some examples of the method, apparatuses, and non-transitory computer-readable medium described herein may further include operations, features, means, or instructions for decoding the control channel resource candidate that corresponds to the uplink cancellation indication prior to decoding other control channel resource candidates in a same control channel monitoring occasion as the control channel resource candidate that corresponds to the uplink cancellation indication according to a decoding prioritization rule.

In some examples of the method, apparatuses, and non-transitory computer-readable medium described herein, the control channel resource candidate that corresponds to the uplink cancellation indication corresponds to a physical downlink control channel blind decoding candidate.

A method of wireless communications at a base station is described. The method may include identifying a configuration for determining a control channel resource candidate that corresponds to an uplink cancellation indication from a set of control channel resource candidates configured for a UE and transmitting the uplink cancellation indication on the control channel resource candidate that corresponds to the uplink cancellation indication based on the configuration.

An apparatus for wireless communications at a base station is described. The apparatus may include a processor, memory coupled with the processor, and instructions stored in the memory. The instructions may be executable by the processor to cause the apparatus to identify a configuration for determining a control channel resource candidate that corresponds to an uplink cancellation indication from a set of control channel resource candidates configured for a UE and transmit the uplink cancellation indication on the control channel resource candidate that corresponds to the uplink cancellation indication based on the configuration.

Another apparatus for wireless communications at a base station is described. The apparatus may include means for identifying a configuration for determining a control channel resource candidate that corresponds to an uplink cancellation indication from a set of control channel resource candidates configured for a UE and transmitting the uplink cancellation indication on the control channel resource candidate that corresponds to the uplink cancellation indication based on the configuration.

A non-transitory computer-readable medium storing code for wireless communications at a base station is described. The code may include instructions executable by a processor to identify a configuration for determining a control channel resource candidate that corresponds to an uplink cancellation indication from a set of control channel resource candidates configured for a UE and transmit the uplink cancellation indication on the control channel resource candidate that corresponds to the uplink cancellation indication based on the configuration.

In some examples of the method, apparatuses, and non-transitory computer-readable medium described herein, identifying the configuration further may include operations, features, means, or instructions for identifying a first configuration indicating that the control channel resource candidate that corresponds to the uplink cancellation indication corresponds to a first control channel resource candidate of the set of control channel resource candidates.

Some examples of the method, apparatuses, and non-transitory computer-readable medium described herein may further include operations, features, means, or instructions for transmitting configuration signaling configuring the UE to monitor a search space in a control resource set with a control channel element aggregation level, where the first control channel resource candidate of the set of control channel resource candidates corresponds to the first control channel resource candidate for the aggregation level for the search space in the control resource set.

Some examples of the method, apparatuses, and non-transitory computer-readable medium described herein may further include operations, features, means, or instructions for differentiating between the control channel resource candidate that corresponds to the uplink cancellation indication and a control channel resource candidate that corresponds to a slot format indicator based on a difference in a radio network temporary identifier for the control channel resource candidate that corresponds to the uplink cancellation indication and the control channel resource candidate that corresponds to the slot format indicator.

In some examples of the method, apparatuses, and non-transitory computer-readable medium described herein, identifying the configuration further may include operations, features, means, or instructions for identifying a second configuration indicating that the control channel resource candidate that corresponds to the uplink cancellation indication corresponds to a control channel resource candidate immediately following a control channel resource candidate configured for slot format indicator monitoring.

Some examples of the method, apparatuses, and non-transitory computer-readable medium described herein may further include operations, features, means, or instructions for transmitting configuration signaling configuring the UE to monitor for a slot format indicator on a same search space and a same control resource set with a same aggregation level as for monitoring for the uplink cancellation indication.

In some examples of the method, apparatuses, and non-transitory computer-readable medium described herein, identifying the configuration further may include operations, features, means, or instructions for identifying a second configuration indicating that control channel resource candidates configured for slot format indicator monitoring may be configured for a first search space in a first control resource set with a first control channel element aggregation level, where the second configuration further indicates that the control channel resource candidate that corresponds to the uplink cancellation indication may be configured for a second search space, a second control resource set, a second control channel element aggregation level, or a combination thereof, that may be different than the first search space, the first control resource set, and the first control channel element aggregation level.

In some examples of the method, apparatuses, and non-transitory computer-readable medium described herein, identifying the configuration further may include operations, features, means, or instructions for identifying a third configuration indicating that control channel resource candidates configured for slot format indicator monitoring and the control channel resource candidate that corresponds to the uplink cancellation indication correspond to a different blind detection.

Some examples of the method, apparatuses, and non-transitory computer-readable medium described herein may further include operations, features, means, or instructions for transmitting configuration signaling indicating the configuration to the UE.

In some examples of the method, apparatuses, and non-transitory computer-readable medium described herein, the control channel resource candidate that corresponds to the uplink cancellation indication corresponds to a physical downlink control channel blind decoding candidate.

DETAILED DESCRIPTION

Figure 1:
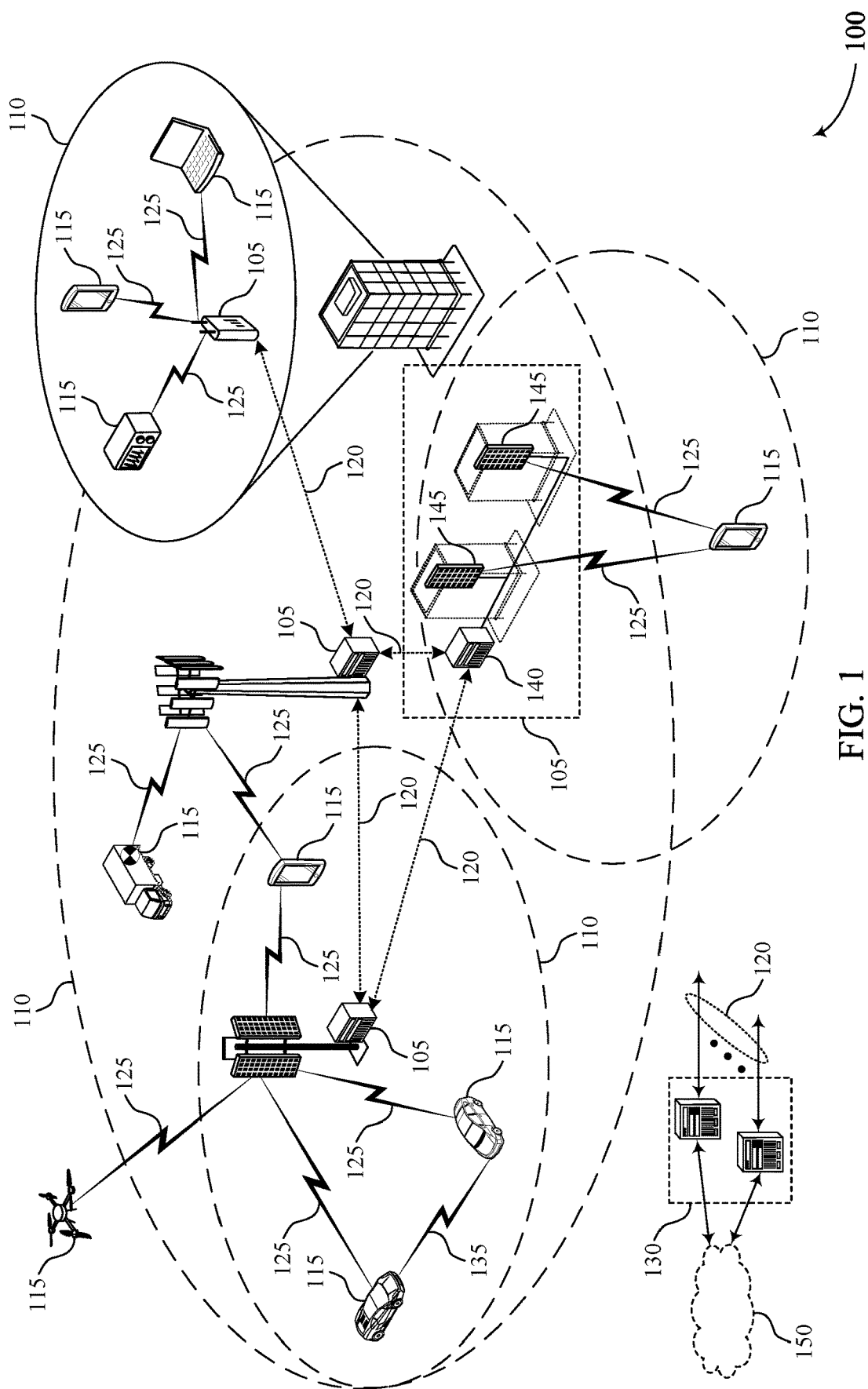
FIG. 1 illustrates an example of a wireless communications system that supports uplink cancellation indication resource determination in accordance with aspects of the present disclosure.

A wireless communications system (e.g., next generation systems such as new radio (NR) or 5G systems) may support signaling that indicates or instructs a user equipment (UE) to cancel some or all of a scheduled uplink transmission. Such signaling may be referred to as an uplink cancellation indication (ULCI) or uplink preemption indication (ULPI). For example, a base station may transmit a ULCI to a UE (e.g., an enhanced mobile broadband (eMBB) UE) to cancel part of a scheduled uplink transmission that overlaps with another uplink transmission from another user (e.g., an ultra-reliable low-latency communication (URLLC) or some other communication having a higher priority or stricter latency and reliability constraints).

A UE may be configured to monitor a control channel (e.g., a physical downlink control channel (PDCCH)) for ULCI messages (e.g., on one or more ULCI monitoring occasions of the PDCCH). In some cases, there may be multiple resources (e.g., time and frequency locations) that could potentially carry the ULCI, and a UE may be configured to monitor one or more of these resources. For example, the UE may be configured to monitor one or more PDCCH candidates from a search space (e.g., a common search space for multiple UEs) in a control resource set (CORESET) for a particular control channel element (CCE) aggregation level. In some cases, the UE may be configured to process downlink messages (e.g., control messages such as downlink control information (DCI) that indicates ULCI) according to a first processing timeline. The UE may receive DCI from the base station that includes a number of PDCCH blind detection candidates that the UE may decode according to the first processing timeline. In some cases, the UE may receive a ULCI as one of the PDCCH blind detection candidates that indicates a cancellation that is to occur according to a faster processing timeline (e.g., relative to other uplink cancellations performed by the UE). In some examples, however, the UE may decode a number of other PDCCH blind detections before decoding the PDCCH blind detection containing the ULCI, and by the time the ULCI is decoded, the UE may not have enough time to process the ULCI and cancel the transmission according to the faster processing timeline. As such, to receive and process the ULCI according to the faster processing timeline, it may be advantageous for a UE to determine which control resource (e.g., which PDCCH blind detection) carries the ULCI, so that the UE may prioritize the decoding of the PDCCH control resource containing the ULCI. For example, the UE may prioritize the decoding of the PDCCH candidate corresponding to the ULCI over the decoding of the other PDCCH candidates in the same PDCCH monitoring occasion. In some examples, prioritizing the PDCCH candidate corresponding to the ULCI may be performed according to a decoding prioritization rule.

Aspects of the disclosure describe configurations and techniques for indicating to a UE which PDCCH candidate corresponds to the ULCI. As such, a UE may be able to identify the ULCI PDCCH candidate before decoding it, which may provide the advantage of reducing latency and processing time in a wireless communications system. In addition, prioritizing decoding of the ULCI PDCCH candidate may increase reliability and reduce collisions between communications in the network (e.g., collisions between eMBB and URLLC communications). The configurations that indicate which PDCCH ULCI corresponds to the ULCI may be statically configured, semi-statically configured, dynamically configured, or any combination of these signaling techniques.

In a first example, if a UE is configured with a search space and a corresponding CORESET for monitoring a PDCCH candidate for ULCI with a CCE aggregation level, then the PDCCH candidate corresponding to the ULCI may be set to a particular PDCCH candidate for that particular CCE aggregation level, search space, and CORESET. For example, the first PDCCH candidate may correspond to the ULCI for a particular CCE aggregation level, search space, and CORESET. In another example, the last PDCCH candidate (or some other set location) may correspond to the ULCI for a particular CCE aggregation level, search space, and CORESET.

In a second example, if a UE is configured to monitor for a slot format indicator (SFI) on the same search space with the same CCE aggregation level as the ULCI, then the PDCCH candidate corresponding to the ULCI may be set relative to the PDCCH candidate(s) that correspond to the SFI in the same search space and aggregation level as the ULCI. For example, if the UE is configured to monitor X number of SFI candidates, then the PDCCH candidate corresponding to the ULCI may be set to X+1, or some other location that is relative to the PDCCH candidates corresponding to the SFI.

In a third example, the UE may be configured such that it does not expect to be configured with SFI and ULCI monitoring in the same search space and same CORESET with the same aggregation level. For example, the UE may be configured to expect that a PDCCH candidate for the SFI and a PDCCH candidate for the ULCI will differ in search space, CORESET, aggregation level, or some combination of these aspects.

In a fourth example, the UE may be configured such that it does not expect that the PDCCH candidate for the ULCI and the PDCCH candidate for the SFI correspond to a same blind detection. For example, the PDCCH candidate for the ULCI and the PDCCH candidate for the SFI may be configured to not satisfy one or more conditions for being considered a same blind detection.

Aspects of the disclosure are initially described in the context of wireless communications systems and process flow diagrams. Aspects of the disclosure are further illustrated by and described with reference to apparatus diagrams, system diagrams, and flowcharts that relate to uplink cancellation indication resource determination.

FIG. 1 illustrates an example of a wireless communications system 100 that supports uplink cancellation indication resource determination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. As used herein, a search space set may also be referred to as a search space, and these two terms may be used interchangeably.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support ULCI or ULPI indications from a base station 105 to a UE 115 and may support configurations and techniques for indicating to a UE 115 which PDCCH candidate corresponds to the ULCI. In a first example, if a UE 115 is configured with a search space and a corresponding CORESET for monitoring a PDCCH candidate for ULCI with a CCE aggregation level, then the PDCCH candidate corresponding to the ULCI may be allocated to a particular PDCCH candidate (e.g., a first or last candidate) for that particular CCE aggregation level, search space, and CORESET. In a second example, if a UE 115 is configured to monitor for an SFI on the same search space with the same CCE aggregation level as the ULCI, then the PDCCH candidate corresponding to the ULCI may be set relative to the PDCCH candidate(s) that correspond to the SFI in the same search space and aggregation level as the ULCI (e.g., the PDCCH candidate may immediately follow the SFI PDCCH candidate). In a third example, the UE 115 may be configured such that it does not expect to be configured with SFI and ULCI monitoring in the same search space and same CORESET and with the same aggregation level. That is, the SFI PDCCH candidate and the ULCI PDCCH candidate may differ in either search space, CORESET, aggregation level, or some combination of these aspects. In a fourth example, a UE 115 may be configured such that it does not expect that the PDCCH candidate for the ULCI and the PDCCH candidate for the SFI correspond to a same blind detection.

Figure 2:
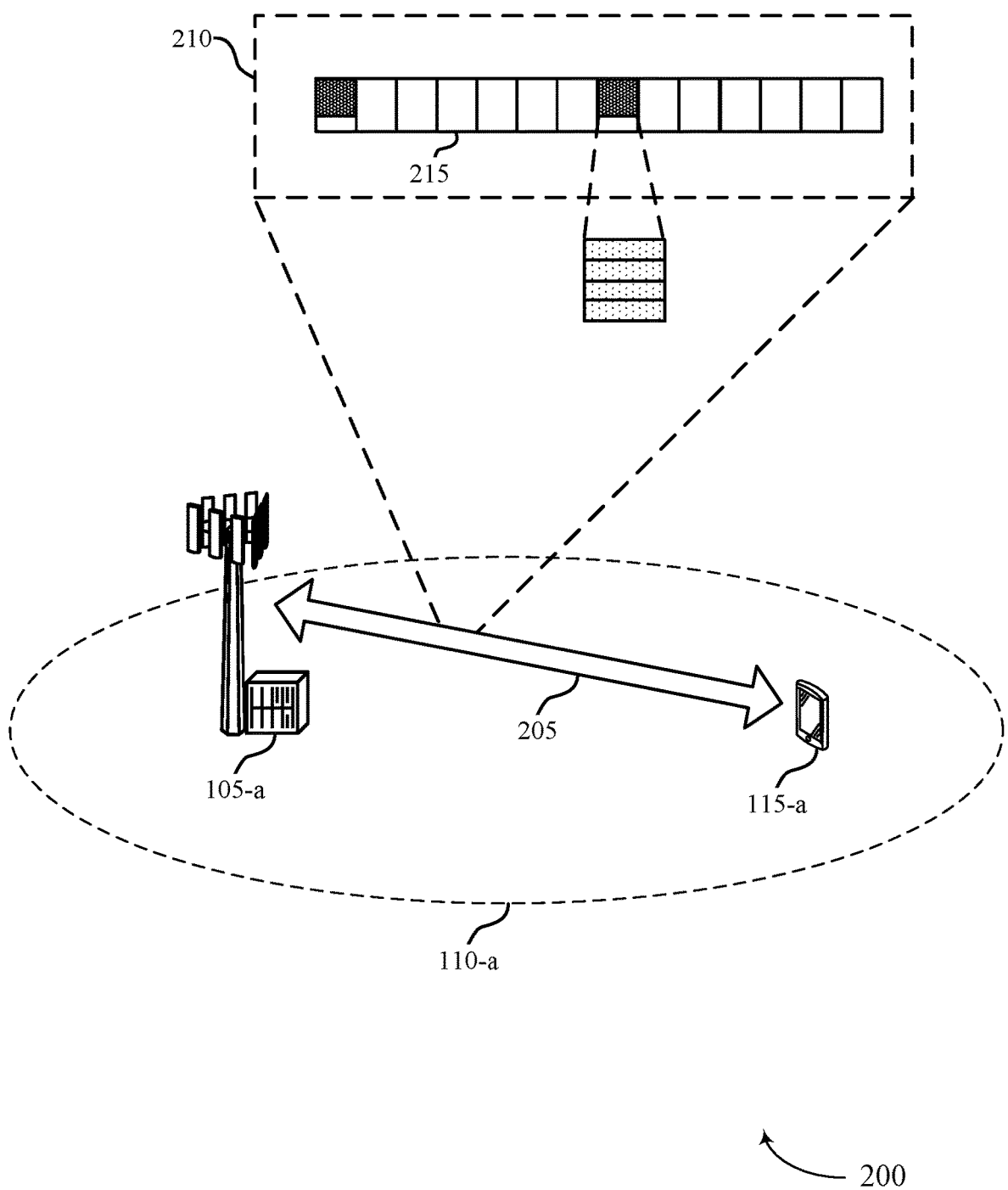
FIG. 2 illustrates an example of a wireless communications system that supports uplink cancellation indication resource determination in accordance with aspects of the present disclosure.

FIG. 2 illustrates an example of a wireless communications system 200 that supports uplink cancellation indication resource determination in accordance with aspects of the present disclosure. In some examples, wireless communications system 200 may implement aspects of wireless communications system 100, and may include a UE 115-a and a base station 105-a, which may communicate over a communications link 205. Wireless communications system 200 may support ULCI signaling and configurations that indicate to the UE 115-a or that allow the UE 115-a to determine which control channel resource corresponds to the ULCI.

In the wireless communications system 200, the UE 115-a may support different service deployments, such as URLLC service and eMBB service. For example, the UE 115-a may support URLLC transmission to reduce end-to-end latency for data transmission and reception associated with the base station 105-a. In some examples, the UE 115-a may correspond to a URLLC UE that supports or is otherwise configured for transmissions, such as periodic transmissions, of relatively small data packets. Additionally or alternatively, the UE 115-a may support eMBB transmissions associated with high data rates across wide coverage areas. In some examples, compared to URLLC communications, eMBB communications may be associated with less stringent latency and reliability targets or thresholds.

To support the conditions associated with the URLLC and eMBB service deployments, or other types of priority-based resource allocation, the base station 105-a and the UE 115-a may implement various techniques for dynamic resource allocation and uplink transmission cancellation or preemption. For example, the base station 105-a may transmit a ULCI, which may also be referred to as an uplink preemption indication (ULPI). For example, the base station 105-a may be configured to transmit a ULCI based on determining a reallocation of uplink resources (e.g., associated with uplink resources allocated to the UE 115-a), and the UEs 115-a may monitor for such ULCIs during a time period such as a slot 210. In some examples, a slot 210 may have search spaces (e.g., search spaces for ULCI monitoring 220) or other resources that are configured for ULCI monitoring.

Cancelation indication signaling, such as a ULCI or a ULPI may allow the base station 105-a to schedule resources having a higher priority or stricter latency requirements (e.g., URLLC transmissions) on resources that were already allocated to the UE 115-a (e.g., which may be an example of an eMBB UE). The base station 105-a may use the ULCI to indicate to the UE 115-a to cancel a portion or all of its transmission (e.g., a portion of an uplink transmission that overlaps with the urgent URLLC transmission from one or more other UEs). In some cases, the ULCI is transmitted before the affected eMBB physical uplink shared channel (PUSCH) transmission (e.g., the portion of the uplink transmission that is to be canceled as a result of the ULCI). The UE 115-a (which may be an example of an eMBB UE) may cancel the overlapping parts of its uplink transmission after receiving the ULCI, which may result in avoiding interference with the URLLC communications.

The base station 105-a may signal a ULCI to the UE 115 according to various techniques. For example, the UE 115-a may be configured to monitor for ULCIs according to various signaling by the base station 105-a, such as various types of downlink control signaling, physical channel signaling, RRC signaling, cell-specific signaling, and other signaling types. In some examples, ULCIs may be conveyed in DCI (e.g., DCI format 2_4) over a PDCCH, which may support group-common or UE-specific ULCIs. For example, the ULCI may be conveyed in one or more PDCCH candidates 225 within a search space for ULCI monitoring 220. In some aspects, the UE 115-a may be configured to frequently monitor a channel or a set of resources for ULCI sent by the base station 105-a. For example, the UE 115-a may be configured to monitor a channel for ULCI more frequently than it may monitor for other PDCCH candidates (such as DCI, or scheduling DCI, including uplink or downlink grants) during a given slot. In some cases, the UE 115-a may report to the base station 105-a its capability for cancelling transmissions according to a received ULCI as well as a capability for PDCCH monitoring.

In some cases, the ULCI is transmitted in a group-common DCI from the base station 105-a. The UE 115-a may monitor the group-common DCI in a common search space (e.g., a search space for ULCI monitoring 220). In some cases, due to monitoring complexity and/or capability timeline constraints, there may be a limitation imposed on the base station 105-a and/or the UE 115-a such that there is only one blind detection candidate (e.g., one PDCCH candidate 225) for ULCI configured per ULCI monitoring occasion, and the UE 115-a may decode a number of other blind detection candidates in addition to the blind detection candidate containing the ULCI.

In some wireless communications systems (e.g., NR systems), a UE may be configured according to one of two processing capability timelines. A first processing capability timeline may be referred to as capability 1 (Cap 1), which may correspond to a relatively slower or regular processing timeline, and may in some examples correspond to eMBB communications. A second processing capability timeline may be referred to as capability 2 (Cap 2), which may correspond to a relatively faster processing timeline (e.g., faster than Cap 1). In some examples, the Cap 2 timeline may be used for URLLC communications, among other high priority and/or low latency communication types. In some cases, the UE 115-a may be configured for a Cap 1 processing timeline, but the UE 115-a may still have to decode the ULCI and cancel its uplink transmission according to the Cap 2 timeline. For example, the UE 115-a may have to be able to cancel its uplink transmission fast enough to comply with the URLLC latency requirement.

This may present a monitoring challenge for the UE 115-a, especially as compared to monitoring other DCI formats (e.g., DCI formats which are received and processed according to a Cap 1 timeline). For example, the UE 115-a may decode a number of PDCCH blind detections of a DCI candidate, but may not be able to determine which PDCCH blind detection contains the ULCI. As such, the UE 115-a may decode a number of other blind detections before decoding and processing the ULCI, and by the time the UE 115-a decodes the ULCI, the UE 115-a may not be able to cancel its transmission according to the Cap 2 timeline.

Based on these monitoring challenges, there may be a limitation on the number of PDCCH blind detection candidates (e.g., PDCCH candidates 225) that can be configured for the ULCI per ULCI monitoring occasion (e.g., per search space for ULCI monitoring 220). In some cases, there may be one PDCCH blind detection candidate configured for the ULCI per ULCI monitoring occasion. However, since the ULCI candidate may be configured in the common search space, there may be other group-common DCI candidates configured in the same search spaced with the same aggregate level as the ULCI candidate. As such, in some examples, it may be advantageous for the UE 115-a to be signaled (or otherwise informed, or be able to determine) prior to the ULCI decoding, which PDCCH candidate 225 corresponds to the ULCI. In such examples, the UE 115-a may be able to prioritize decoding the PDCCH candidate 225 containing the ULCI before decoding other PDCCH candidates. Such information, and the associated signaling and configurations, may facilitate the UE 115-a in prioritizing the ULCI decoding, which may allow the UE 115-a (which may be an eMBB UE operating according to a Cap 1 timeline) to meet the Cap 2 processing timeline. By prioritizing downlink ULPI or ULCI or limiting the number of blind detection candidates, the wireless communications system 200 may facilitate increased communications efficiency, and may support different transmission processing timelines configured for different devices.

In accordance with aspects of the present disclosure, techniques are described to identify, indicate, or otherwise determine which PDCCH candidate 225 (e.g., which blind detection candidate) within a configured monitoring occasion or search space corresponds to the ULCI. Such techniques may be described in a number of examples, which may be implemented individually or in any combination by the UE 115-a.

In a first example, if the UE 115-a is configured with a search space s in one or more serving cells, and a corresponding CORESET p for monitoring a PDCCH candidate for the ULCI (e.g., DCI format 2_4), with a CCE aggregation level L, then the PDCCH candidate for the ULCI may be the first PDCCH candidate or the last PDCCH candidate (or some other set location) for a CCE aggregation level L for the search space s in CORESET p. In this example, if an SFI is configured to be monitored in the same search space s within the same aggregation level L, the same PDCCH candidate may correspond to either the SFI or the ULCI. In such cases, the SFI and the ULCI may be differentiated by an identifier (e.g., scrambled by different radio network temporary identifiers (RNTI)). In some examples, there may be a limit of 2 SFI candidates that can be configured in a search space. In such cases, the base station 105-a may use the first candidate to transmit ULCI, and the second candidate to transmit SFI in the case where both SFI and ULCI are to be transmitted in the same monitoring occasion by the base station 105-a.

In a second example, if the UE 115-a is configured to monitor SFI (e.g., corresponding to a DCI format 2_0), on the same search space s with the same aggregation level L as the ULCI, then the PDCCH candidate corresponding to the ULCI may be the candidate immediately following (e.g., right after in the time domain, the frequency domain, according to an SFI index, etc.) the PDCCH candidate(s) for the SFI, or some other location that is set relative to the SFI PDCCH candidate. For example, if the UE 115-a is configured to monitor X number of SFI candidates, then the PDCCH candidate corresponding to the ULCI may be the "X+1$^{th}$" candidate in the search space s with aggregation level L, where the first X candidate(s) correspond to the SFI.

In a third example, the UE 115-a may not expect (e.g., based on a configuration, signaling from the base station 105-a, etc.) to be configured with SFI and ULCI monitoring in the same search space and the same CORESET and with the same aggregation level. For example, the UE 115-a may be configured to expect that a PDCCH candidate for the SFI and a PDCCH candidate for the ULCI will differ in search space, CORESET, aggregation level, or some combination of these aspects. As an example, if the SFI PDCCH candidate and the ULCI PDCCH candidate are configured in a same search space and a same CORESET, then the configuration may indicate that the CCE aggregation level for the two PDCCH candidates are different.

In a fourth example, the UE 115-a may be configured such that it does not expect that the PDCCH candidate for the ULCI and the PDCCH candidate for the SFI to correspond to a same blind detection. For example, the PDCCH candidate for the ULCI and the PDCCH candidate for the SFI may be configured to not satisfy one or more conditions for being determined a same blind detection. Two PDCCH candidates may be determined to be corresponding to a same blind detection if they satisfy the following conditions: the two PDCCH candidates are transmitted on the same CORESET; the two PDCCH candidates are transmitted on the same set of CCEs (which implies that the two PDCCH candidates are using the same aggregation level); the two PDCCH candidates are transmitted using the same scrambling ID; and the DCI format associated with the two PDCCH candidates have the same DCI size. Therefore, according to the fourth example, at least one of these four conditions is not satisfied for the ULCI PDCCH candidate and the SFI PDCCH candidate.

Figure 3:
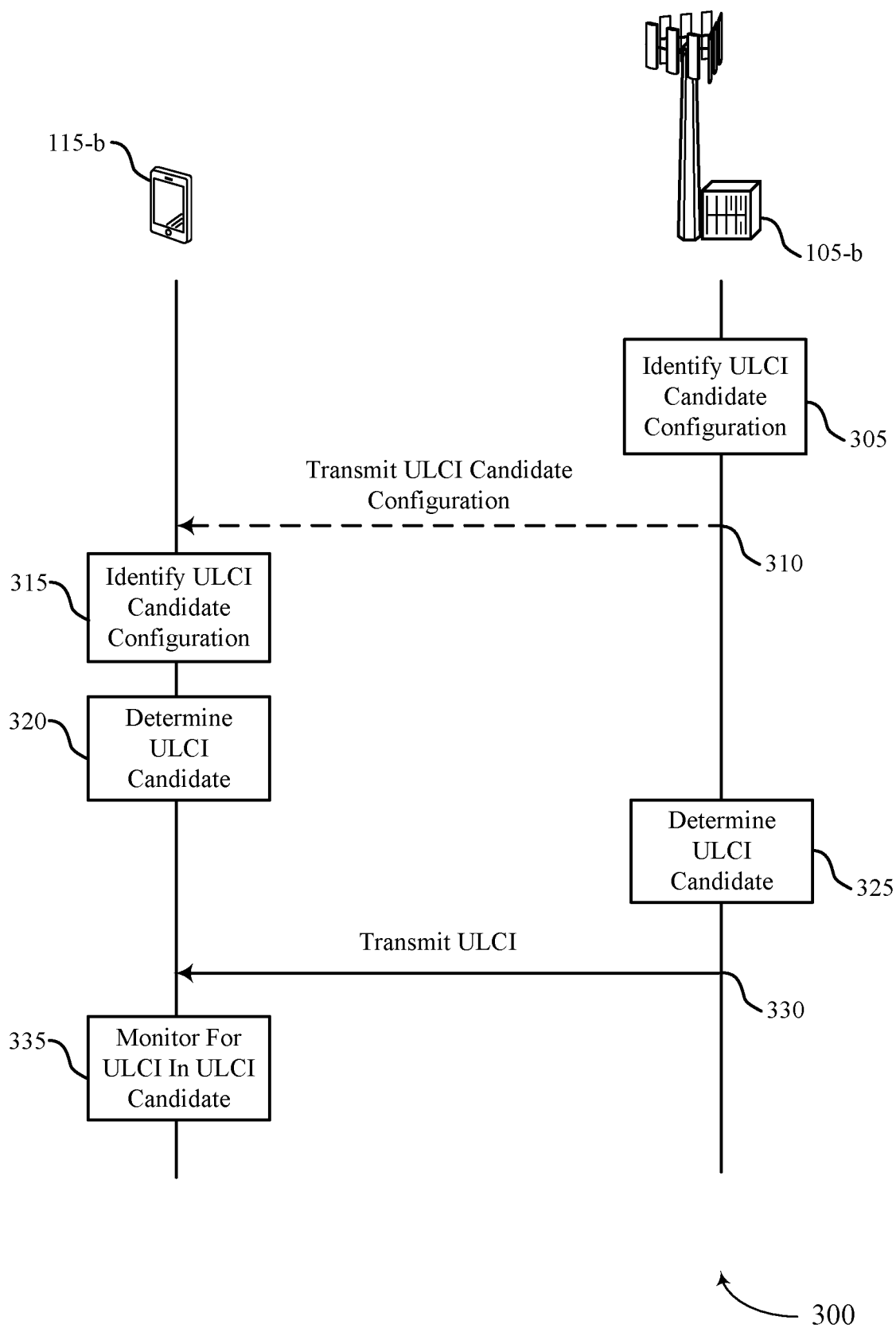
FIG. 3 illustrates an example of a process flow that supports uplink cancellation indication resource determination in accordance with aspects of the present disclosure.

FIG. 3 illustrates an example of a process flow 300 that supports uplink cancellation indication resource determination in accordance with aspects of the present disclosure. In some examples, process flow 300 may implement aspects of wireless communications system 100 or wireless communications system 200. For example, process flow 300 may support configurations indicating to a UE which PDCCH candidate corresponds to a ULCI. Alternative examples of the following may be implemented, where some steps are performed in a different order than described or may not be performed at all. In some cases, steps may include additional features not mentioned below, or further steps may be added.

At 305, a base station 105-b may identify a configuration for determining a control channel resource candidate (e.g., a PDCCH blind decoding candidate) that corresponds to an uplink cancellation indication (e.g., a ULCI or a ULPI) from a plurality of control channel resource candidates configured for a UE 115-b.

At 310, the base station 105-b may transmit, and the UE 115-b may receive, an indication of the configuration for determining the control channel resource candidate that corresponds to the uplink cancellation indication.

At 315, the UE 115-b may identify a configuration for determining a control channel resource candidate (e.g., a PDCCH blind decoding candidate) that corresponds to an uplink cancellation indication (e.g., a ULCI or a ULPI) from a set of control channel resource candidates configured for the UE 115-b. The UE 115-b may identify the configuration based on the configuration indicated by the base station 105-b at 310. Additionally or alternatively, the UE 115-b may identify the indication based on a static configuration or any other type of signaling or configuration techniques.

In a first example, the configuration may include a first configuration indicating that the control channel resource candidate that corresponds to the ULCI corresponds to a first control channel resource candidate of the set of control channel resource candidates. In this example, the UE 115-b may also receive configuration signaling configuring the UE 115-b to monitor a search space in a CORESET with a CCE aggregation level, where the first control channel resource candidate of the set of control channel resource candidates corresponds to the first control channel resource candidate for the aggregation level for the search space in the CORESET. Additionally or alternatively, the UE 115-b may differentiate between the control channel resource candidate that corresponds to the ULCI and a control channel resource candidate that corresponds to an SFI based on a difference in a RNTI for the control channel resource candidate that corresponds to the ULCI and the control channel resource candidate that corresponds to the SFI.

In a second example, the configuration may include a second configuration indicating that the control channel resource candidate that corresponds to the ULCI corresponds to a control channel resource candidate immediately following a control channel resource candidate configured for SFI monitoring. In this example, the UE 115-b may receive configuration signaling configuring the UE 115-b to monitor for an SFI on a same search space and with a same aggregation level as for monitoring for the ULCI.

In a third example, the configuration may include a second configuration indicating that control channel resource candidates configured for SFI monitoring are configured for a first search space in a first CORESET with a first control channel element aggregation level, wherein the second configuration further indicates that the control channel resource candidate that corresponds to the ULCI is configured for a second search space, a second CORESET, a second control channel element aggregation level, or a combination thereof, that is different than the first search space, the first CORESET, and the first control channel element aggregation level. For example, the UE 115-b may be configured to expect that a PDCCH candidate for the SFI and a PDCCH candidate for the ULCI will differ in the search space, CORESET, aggregation level, or some combination of these aspects. That is, in this example, the UE 115-b may not expect to be configured with SFI and ULCI monitoring in the same search space and the same CORESET and with the same CCE aggregation level.

In a fourth example, the UE 115-b may be configured such that it does not expect that the PDCCH candidate for the ULCI and the PDCCH candidate for the SFI correspond to a same blind detection.

At 320, the UE 115-b may determine the control channel resource candidate that corresponds to the ULCI from the plurality of control channel resource candidates based on the configuration (e.g., the configuration identified at 315).

At 325, the base station 105-b may determine the control channel resource candidate that corresponds to the ULCI from the plurality of control channel resource candidates based on the ULCI candidate configuration (e.g., the configuration identified at 305

At 330, the base station 105-b may transmit, and the UE 115-b may receive a ULCI (or a ULPI). The ULCI may be transmitted in the PDCCH candidate (e.g., a PDCCH blind decoding candidate) indicated by the configuration identified at 305 and 315.

At 335, the UE 115-b may monitor for the ULCI in the control channel resource candidate (e.g., PDCCH blind decoding candidate) that was determined at 320 and 325. Upon receiving the ULCI, the UE 115-b may cancel an uplink transmission in accordance with the ULCI. In some examples, the UE 115-b may process the ULCI and cancel the uplink transmission according to a reduced latency target.

Figure 4:
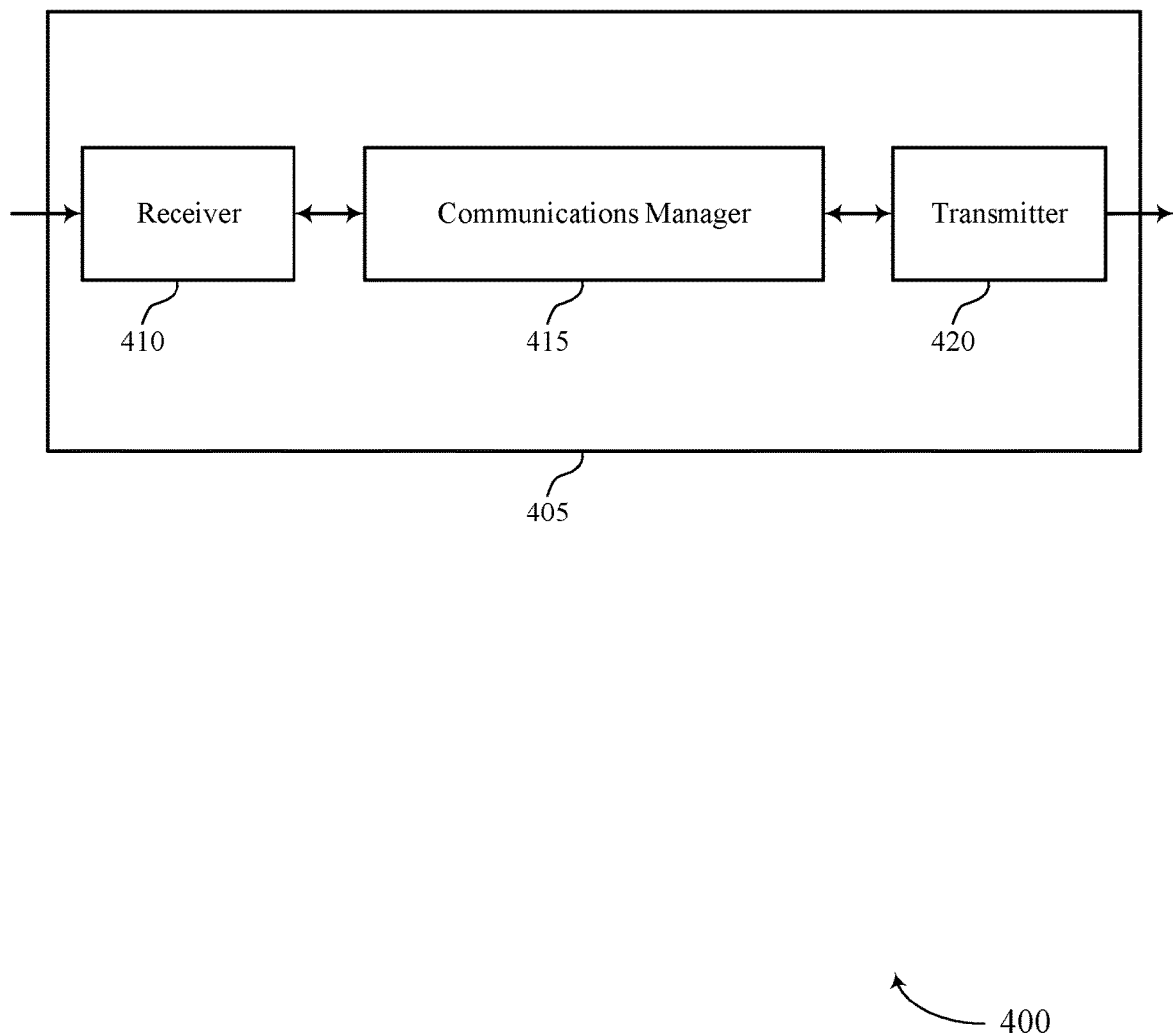
FIGS. 4 and 5 show block diagrams of devices that support uplink cancellation indication resource determination in accordance with aspects of the present disclosure.

FIG. 4 shows a block diagram 400 of a device 405 that supports uplink cancellation indication resource determination in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to uplink cancellation indication resource determination, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a configuration for determining a control channel resource candidate that corresponds to an uplink cancellation indication from a set of control channel resource candidates configured for the UE, determine the control channel resource candidate that corresponds to the uplink cancellation indication from the set of control channel resource candidates based on the configuration, and monitor for the uplink cancellation indication in the control channel resource candidate that corresponds to the uplink cancellation indication based on the determining. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, communications manager 415 may be implemented as an integrated circuit or chipset for a mobile device modem, and the receiver 410 and transmitter 420 may be implemented as analog components (e.g., amplifiers, filters, antennas, etc.) coupled with the mobile device modem to enable wireless transmission and reception.

The communications manager 415 as described herein may be implemented to realize one or more potential advantages. Various implementations may enable increased communications efficiency and reliability, and reduced communications latency. At least one implementation may enable the communications manager 415 to effectively identify and process a ULCI, and cancel a transmission from a eMBB device according to a reduced processing time period. At least one implementation may enable communications manager 415 to reduce collisions between transmitting devices in the wireless network.

Based on implementing the techniques for identifying and processing ULCI as described herein, one or more processors of the device 405 (e.g., processor(s) controlling or incorporated with one or more of receiver 410, communications manager 415, and transmitter 420) may reduce an amount of time required to effectively identify, decode, and process ULCI transmitted from a transmitting device. In some examples, the described techniques may reduce latency and increase processing time for devices supporting ULCI.

Figure 5:
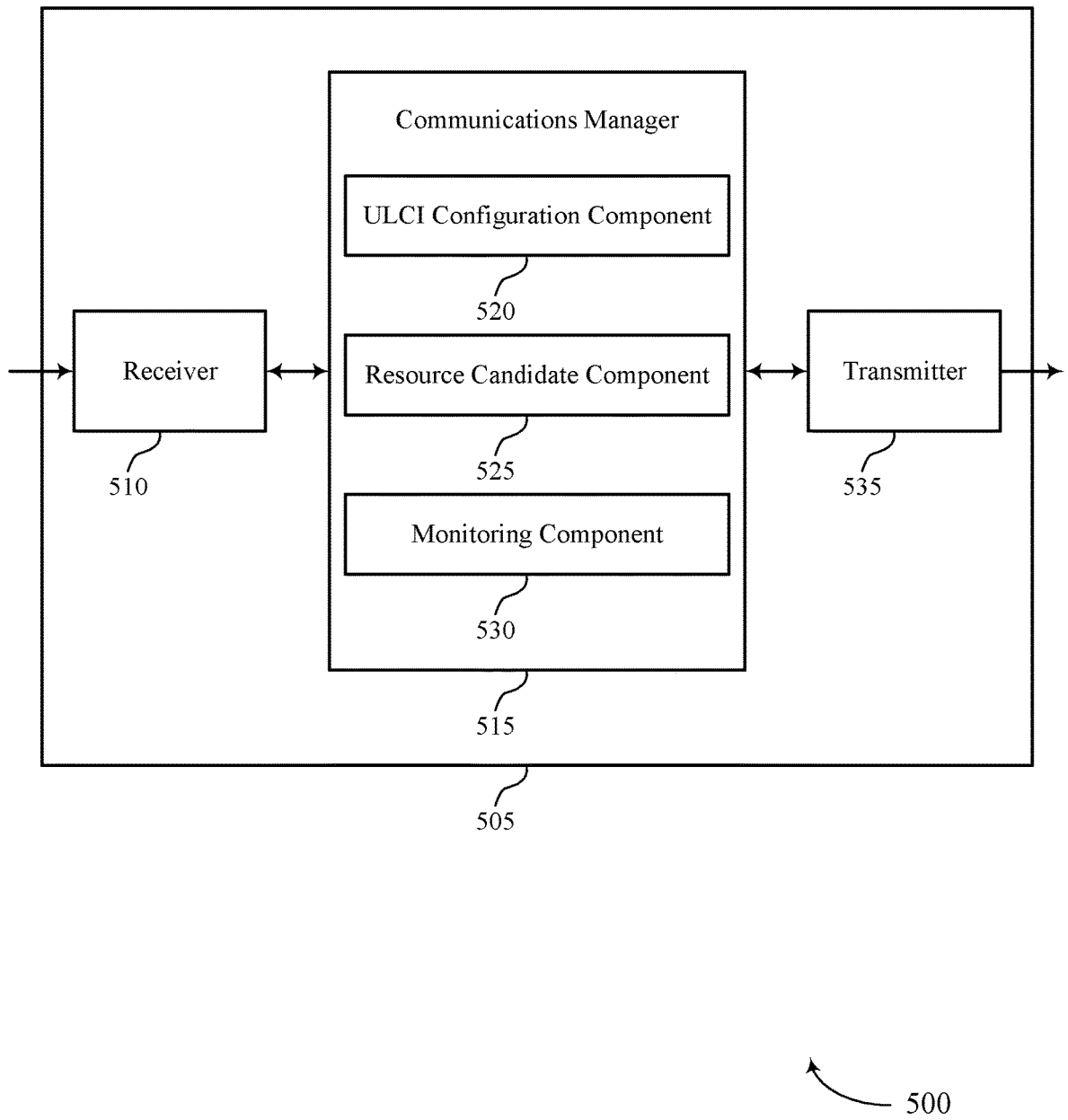

FIG. 5 shows a block diagram 500 of a device 505 that supports uplink cancellation indication resource determination in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to uplink cancellation indication resource determination, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a ULCI configuration component 520, a resource candidate component 525, and a monitoring component 530. The communications manager 515 may be an example of aspects of the communications manager 710 described herein.

The ULCI configuration component 520 may identify a configuration for determining a control channel resource candidate that corresponds to an uplink cancellation indication from a set of control channel resource candidates configured for the UE.

The resource candidate component 525 may determine the control channel resource candidate that corresponds to the uplink cancellation indication from the set of control channel resource candidates based on the configuration.

The monitoring component 530 may monitor for the uplink cancellation indication in the control channel resource candidate that corresponds to the uplink cancellation indication based on the determining.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
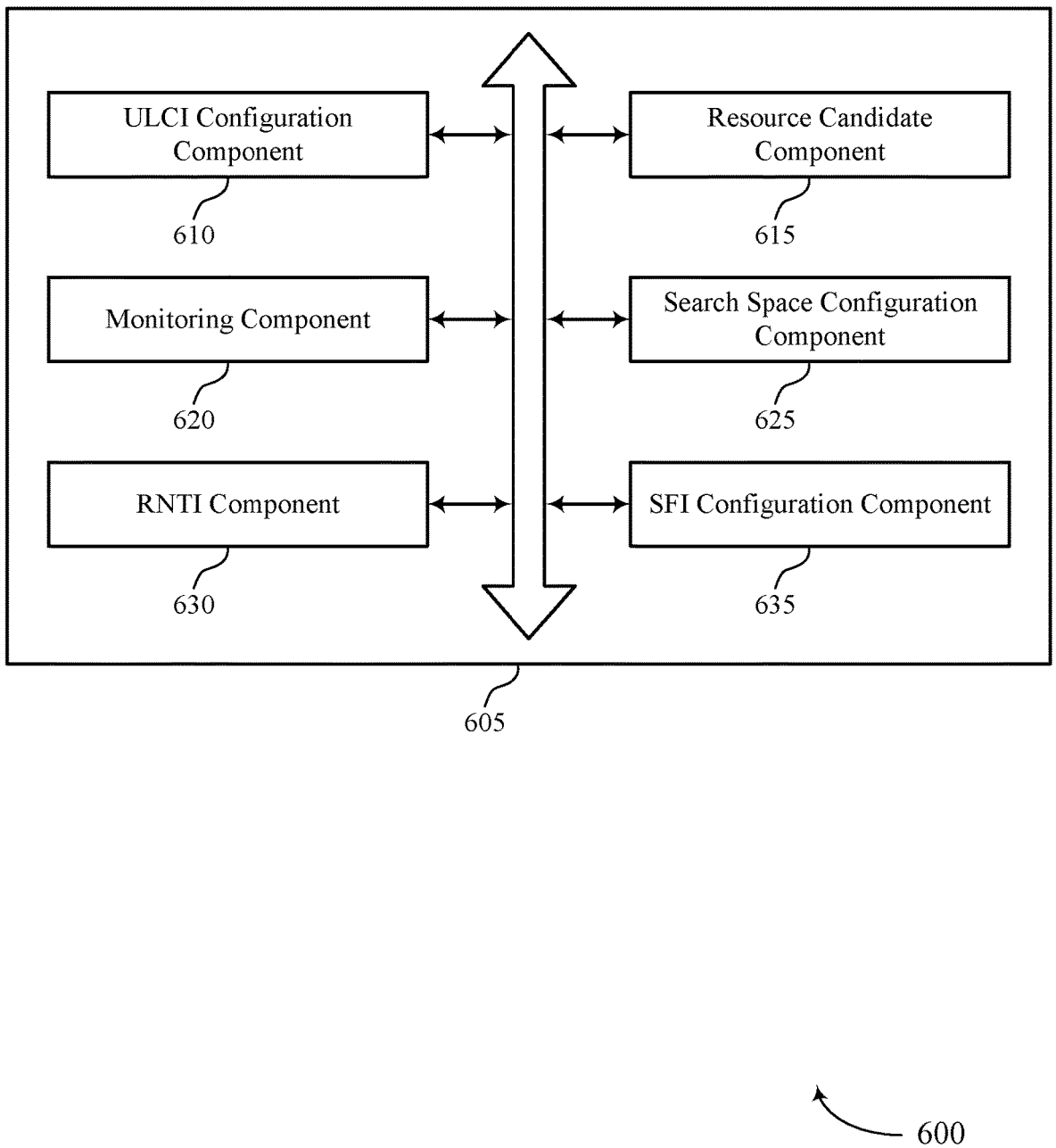
FIG. 6 shows a block diagram of a communications manager that supports uplink cancellation indication resource determination in accordance with aspects of the present disclosure.

FIG. 6 shows a block diagram 600 of a communications manager 605 that supports uplink cancellation indication resource determination in accordance with aspects of the present disclosure. The communications manager 605 may be an example of aspects of a communications manager 415, a communications manager 515, or a communications manager 710 described herein. The communications manager 605 may include a ULCI configuration component 610, a resource candidate component 615, a monitoring component 620, a search space configuration component 625, a RNTI component 630, and an SFI configuration component 635. Each of these modules may communicate, directly or indirectly, with one another (e.g., via one or more buses).

The ULCI configuration component 610 may identify a configuration for determining a control channel resource candidate that corresponds to an uplink cancellation indication from a set of control channel resource candidates configured for the UE.

In some examples, the ULCI configuration component 610 may identify a first configuration indicating that the control channel resource candidate that corresponds to the uplink cancellation indication corresponds to a first control channel resource candidate of the set of control channel resource candidates.

In some examples, the ULCI configuration component 610 may identify a second configuration indicating that the control channel resource candidate that corresponds to the uplink cancellation indication corresponds to a control channel resource candidate immediately following a control channel resource candidate configured for slot format indicator monitoring.

In some examples, the ULCI configuration component 610 may identify a second configuration indicating that control channel resource candidates configured for slot format indicator monitoring are configured for a first search space in a first control resource set with a first control channel element aggregation level, where the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

In some examples, the ULCI configuration component 610 may identify a third configuration indicating that control channel resource candidates configured for slot format indicator monitoring and the control channel resource candidate that corresponds to the uplink cancellation indication correspond to a different blind detection.

In some cases, the control channel resource candidate that corresponds to the uplink cancellation indication corresponds to a physical downlink control channel blind decoding candidate.

The resource candidate component 615 may determine the control channel resource candidate that corresponds to the uplink cancellation indication from the set of control channel resource candidates based on the configuration.

The monitoring component 620 may monitor for the uplink cancellation indication in the control channel resource candidate that corresponds to the uplink cancellation indication based on the determining. In some examples, the monitoring component 620 may decode the control channel resource candidate that corresponds to the uplink cancellation indication prior to decoding other control channel resource candidates in a same control channel monitoring occasion as the control channel resource candidate that corresponds to the uplink cancellation indication according to a decoding prioritization rule.

The search space configuration component 625 may receive configuration signaling configuring the UE to monitor a search space in a control resource set with a control channel element aggregation level, where the first control channel resource candidate of the set of control channel resource candidates corresponds to the first control channel resource candidate for the aggregation level for the search space in the control resource set.

The RNTI component 630 may differentiate between the control channel resource candidate that corresponds to the uplink cancellation indication and a control channel resource candidate that corresponds to a slot format indicator based on a difference in a radio network temporary identifier for the control channel resource candidate that corresponds to the uplink cancellation indication and the control channel resource candidate that corresponds to the slot format indicator.

The SFI configuration component 635 may receive configuration signaling configuring the UE to monitor for a slot format indicator on a same search space and a same control resource set with a same aggregation level as for monitoring for the uplink cancellation indication.

Figure 7:
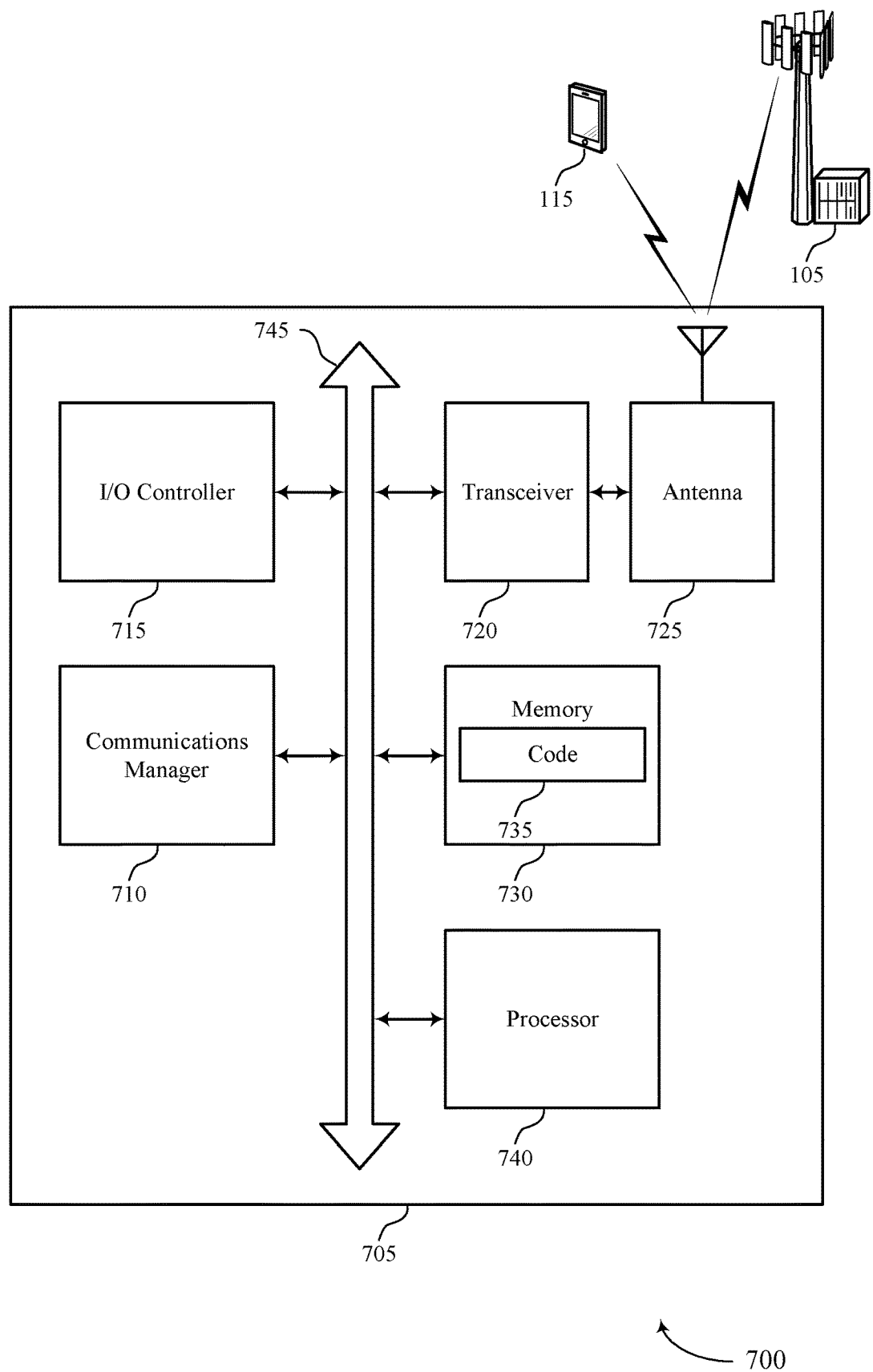
FIG. 7 shows a diagram of a system including a device that supports uplink cancellation indication resource determination in accordance with aspects of the present disclosure.

FIG. 7 shows a diagram of a system 700 including a device 705 that supports uplink cancellation indication resource determination in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a configuration for determining a control channel resource candidate that corresponds to an uplink cancellation indication from a set of control channel resource candidates configured for the UE, determine the control channel resource candidate that corresponds to the uplink cancellation indication from the set of control channel resource candidates based on the configuration, and monitor for the uplink cancellation indication in the control channel resource candidate that corresponds to the uplink cancellation indication based on the determining.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting uplink cancellation indication resource determination).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
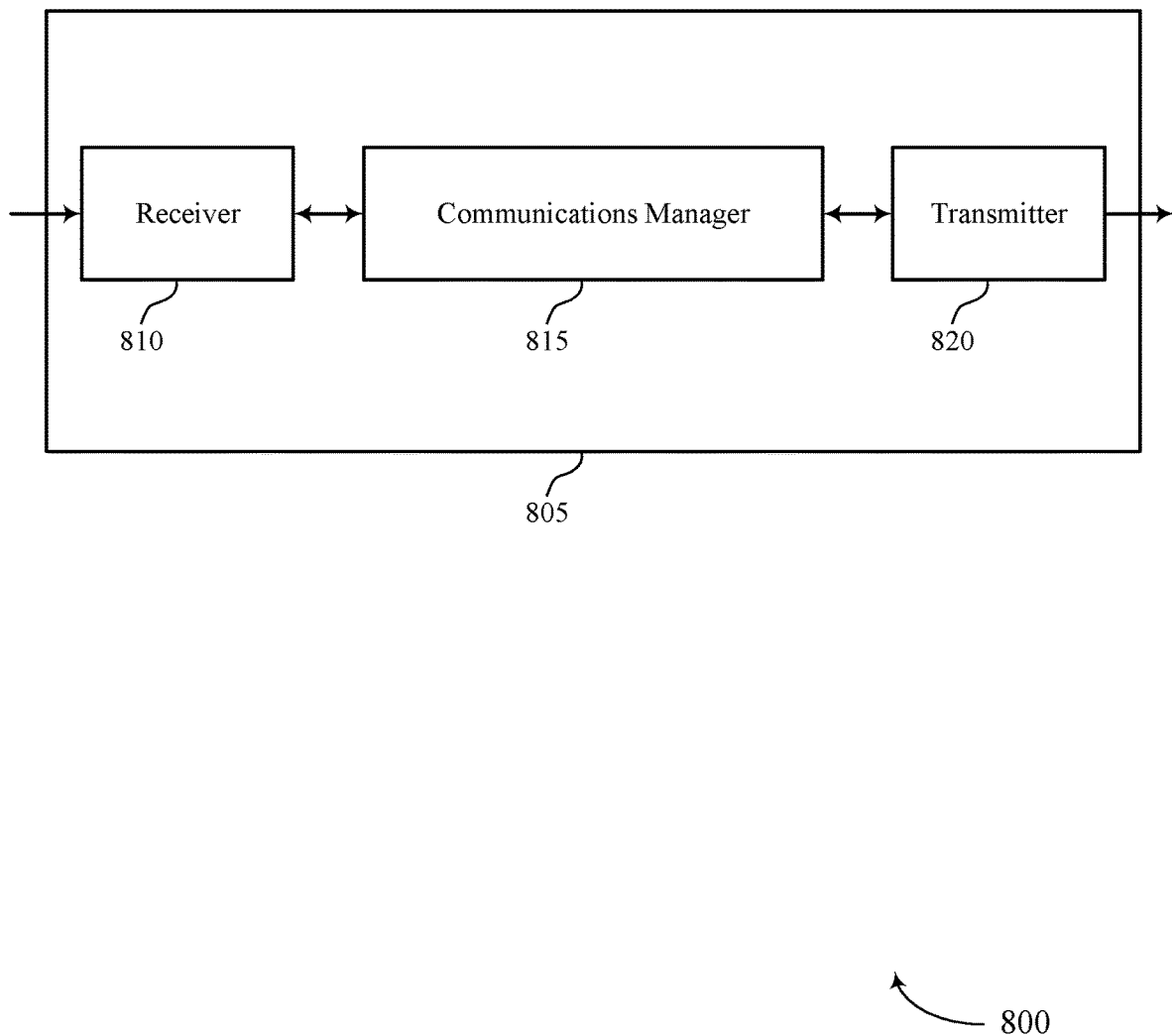
FIGS. 8 and 9 show block diagrams of devices that support uplink cancellation indication resource determination in accordance with aspects of the present disclosure.

FIG. 8 shows a block diagram 800 of a device 805 that supports uplink cancellation indication resource determination in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink cancellation indication resource determination, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a configuration for determining a control channel resource candidate that corresponds to an uplink cancellation indication from a set of control channel resource candidates configured for a UE and transmit the uplink cancellation indication on the control channel resource candidate that corresponds to the uplink cancellation indication based on the configuration. The communications manager 815 may be an example of aspects of the communications manager 1110 described with reference to FIG. 11.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Various implementations of device 805 may enable increased communications efficiency and reliability, and reduced communications latency. At least one implementation may enable the communications manager 815 to effectively identify a configuration for identifying a ULCI to send to a receiving device. At least one implementation may enable communications manager 815 to cancel or reschedule transmissions (e.g., using a ULCI).

Based on implementing the techniques for identifying and processing ULCI as described herein, one or more processors of the device 805 (e.g., processor(s) controlling or incorporated with one or more of receiver 810, communications manager 815, and transmitter 820) may reduce an amount of time required to effectively identify, decode, and process ULCI transmitted to a receiving device. In some examples, the described techniques may reduce latency and provide scheduling flexibility for the device 805.

Figure 9:
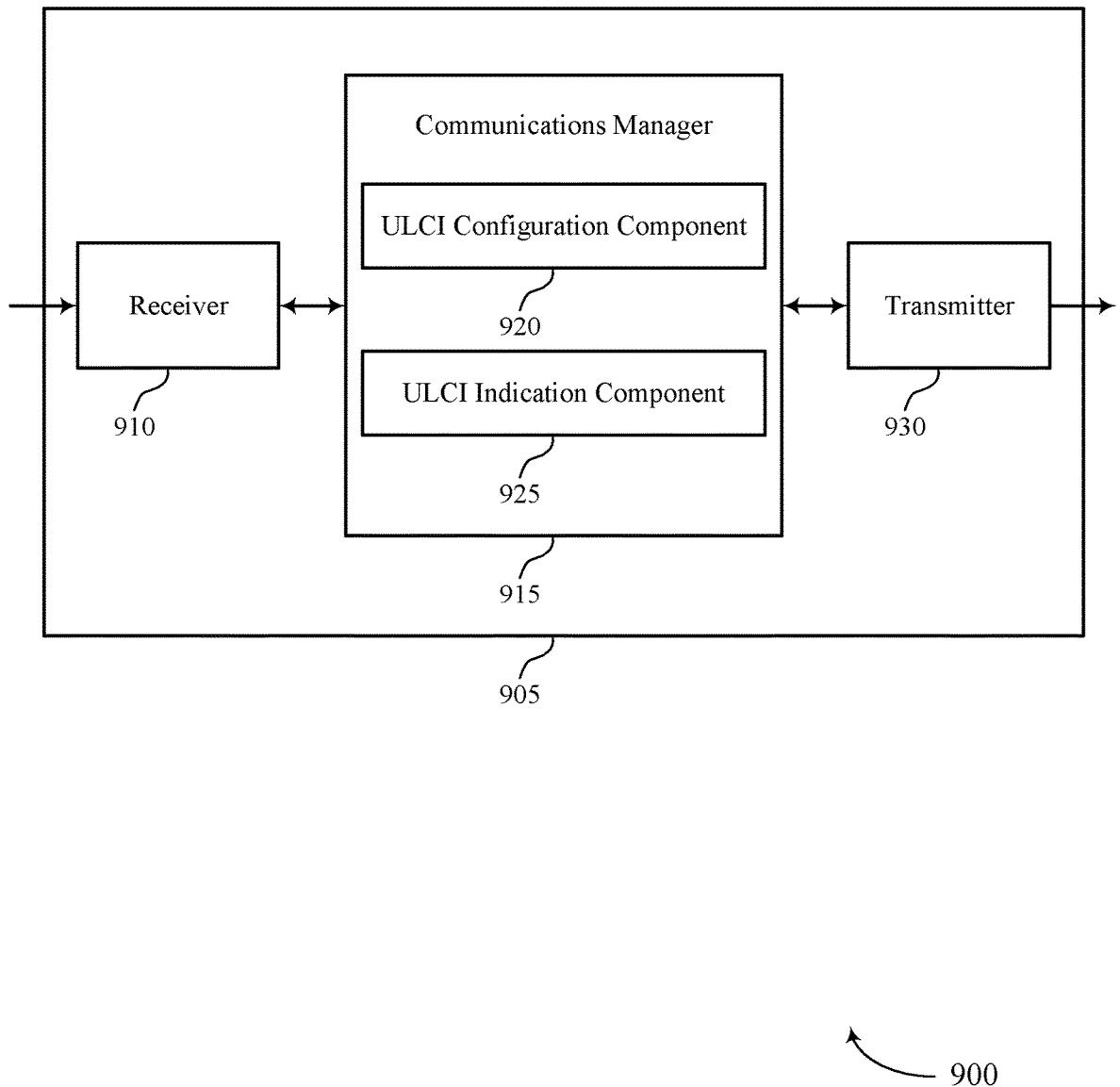

FIG. 9 shows a block diagram 900 of a device 905 that supports uplink cancellation indication resource determination in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to uplink cancellation indication resource determination, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a ULCI configuration component 920 and a ULCI indication component 925. The communications manager 915 may be an example of aspects of the communications manager 1110 described with reference to FIG. 11.

The ULCI configuration component 920 may identify a configuration for determining a control channel resource candidate that corresponds to an uplink cancellation indication from a set of control channel resource candidates configured for a UE.

The ULCI indication component 925 may transmit the uplink cancellation indication on the control channel resource candidate that corresponds to the uplink cancellation indication based on the configuration.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
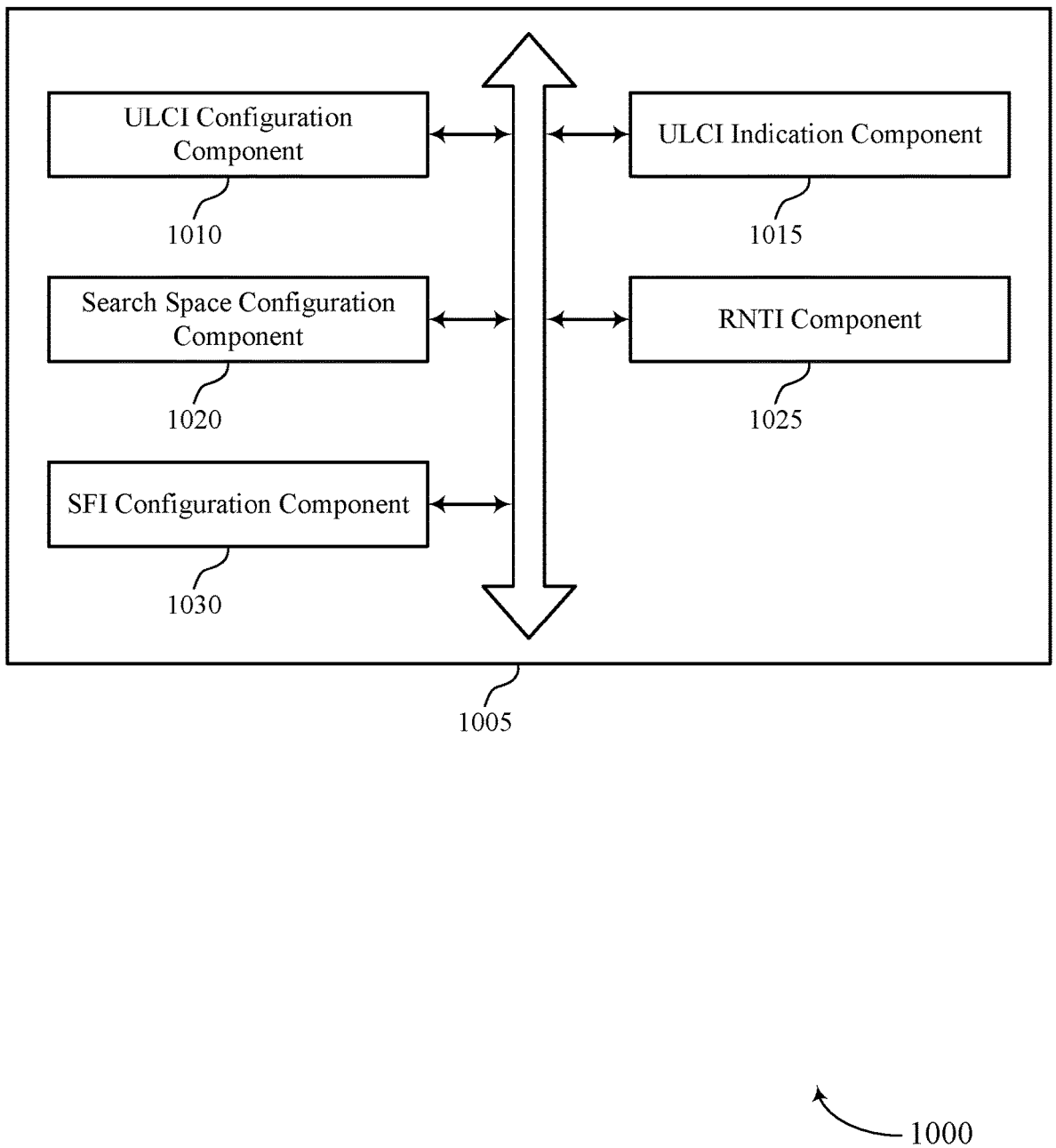
FIG. 10 shows a block diagram of a communications manager that supports uplink cancellation indication resource determination in accordance with aspects of the present disclosure.

FIG. 10 shows a block diagram 1000 of a communications manager 1005 that supports uplink cancellation indication resource determination in accordance with aspects of the present disclosure. The communications manager 1005 may be an example of aspects of a communications manager 815, a communications manager 915, or a communications manager 1110 described herein. The communications manager 1005 may include a ULCI configuration component 1010, a ULCI indication component 1015, a search space configuration component 1020, a RNTI component 1025, and an SFI configuration component 1030. Each of these modules may communicate, directly or indirectly, with one another (e.g., via one or more buses).

The ULCI configuration component 1010 may identify a configuration for determining a control channel resource candidate that corresponds to an uplink cancellation indication from a set of control channel resource candidates configured for a UE.

In some examples, the ULCI configuration component 1010 may identify a first configuration indicating that the control channel resource candidate that corresponds to the uplink cancellation indication corresponds to a first control channel resource candidate of the set of control channel resource candidates.

In some examples, the ULCI configuration component 1010 may identify a second configuration indicating that the control channel resource candidate that corresponds to the uplink cancellation indication corresponds to a control channel resource candidate immediately following a control channel resource candidate configured for slot format indicator monitoring.

In some examples, the ULCI configuration component 1010 may identify a second configuration indicating that control channel resource candidates configured for slot format indicator monitoring are configured for a first search space in a first control resource set with a first control channel element aggregation level, where the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

In some examples, the ULCI configuration component 1010 may identify a third configuration indicating that control channel resource candidates configured for slot format indicator monitoring and the control channel resource candidate that corresponds to the uplink cancellation indication correspond to a different blind detection.

In some examples, the ULCI configuration component 1010 may transmit configuration signaling indicating the configuration to the UE.

In some cases, the control channel resource candidate that corresponds to the uplink cancellation indication corresponds to a physical downlink control channel blind decoding candidate.

The ULCI indication component 1015 may transmit the uplink cancellation indication on the control channel resource candidate that corresponds to the uplink cancellation indication based on the configuration.

The search space configuration component 1020 may transmit configuration signaling configuring the UE to monitor a search space in a control resource set with a control channel element aggregation level, where the first control channel resource candidate of the set of control channel resource candidates corresponds to the first control channel resource candidate for the aggregation level for the search space in the control resource set.

The RNTI component 1025 may differentiate between the control channel resource candidate that corresponds to the uplink cancellation indication and a control channel resource candidate that corresponds to a slot format indicator based on a difference in a radio network temporary identifier for the control channel resource candidate that corresponds to the uplink cancellation indication and the control channel resource candidate that corresponds to the slot format indicator.

The SFI configuration component 1030 may transmit configuration signaling configuring the UE to monitor for a slot format indicator on a same search space and a same control resource set with a same aggregation level as for monitoring for the uplink cancellation indication.

Figure 11:
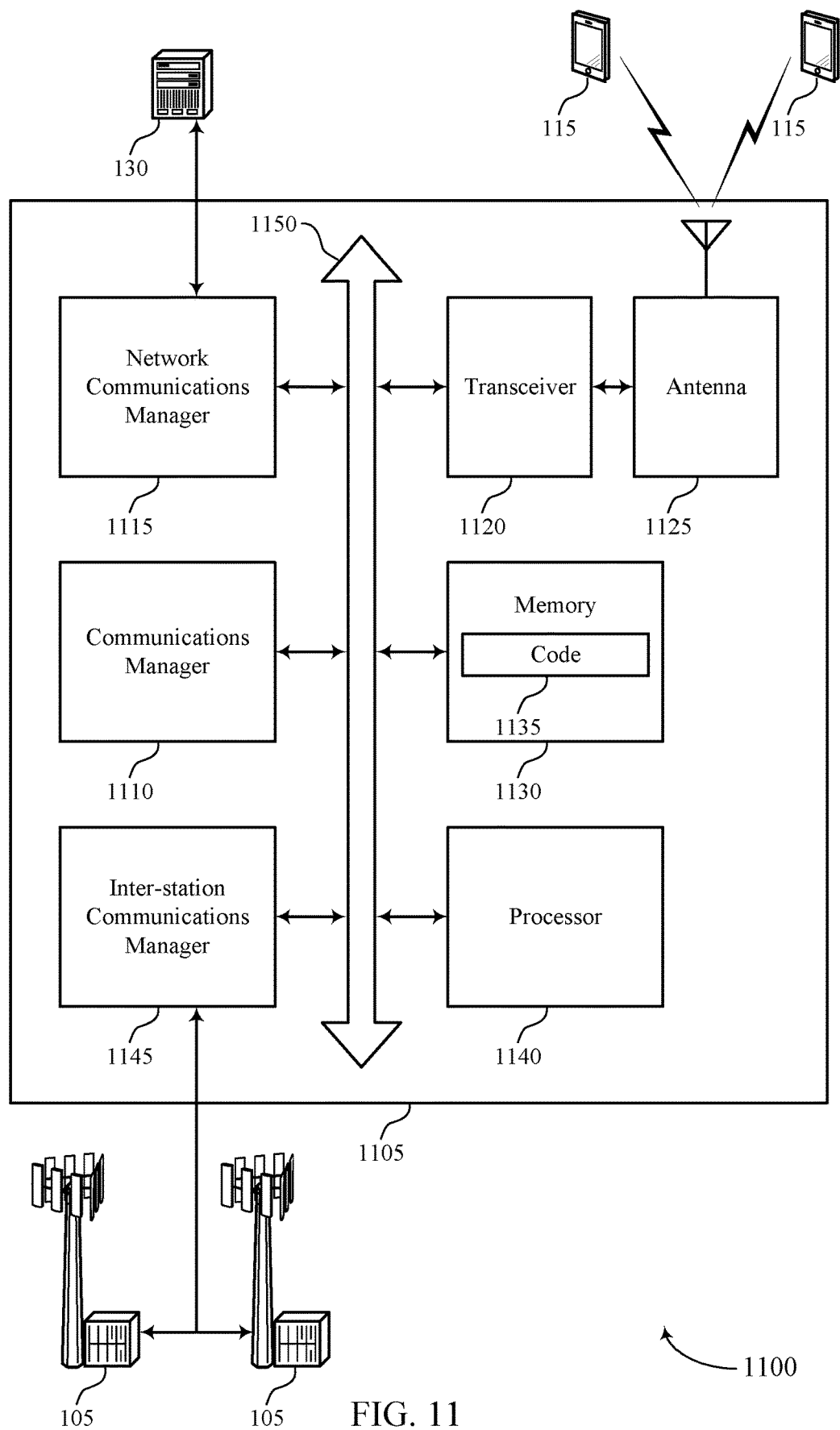
FIG. 11 shows a diagram of a system including a device that supports uplink cancellation indication resource determination in accordance with aspects of the present disclosure.

FIG. 11 shows a diagram of a system 1100 including a device 1105 that supports uplink cancellation indication resource determination in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a configuration for determining a control channel resource candidate that corresponds to an uplink cancellation indication from a set of control channel resource candidates configured for a UE and transmit the uplink cancellation indication on the control channel resource candidate that corresponds to the uplink cancellation indication based on the configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting uplink cancellation indication resource determination).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
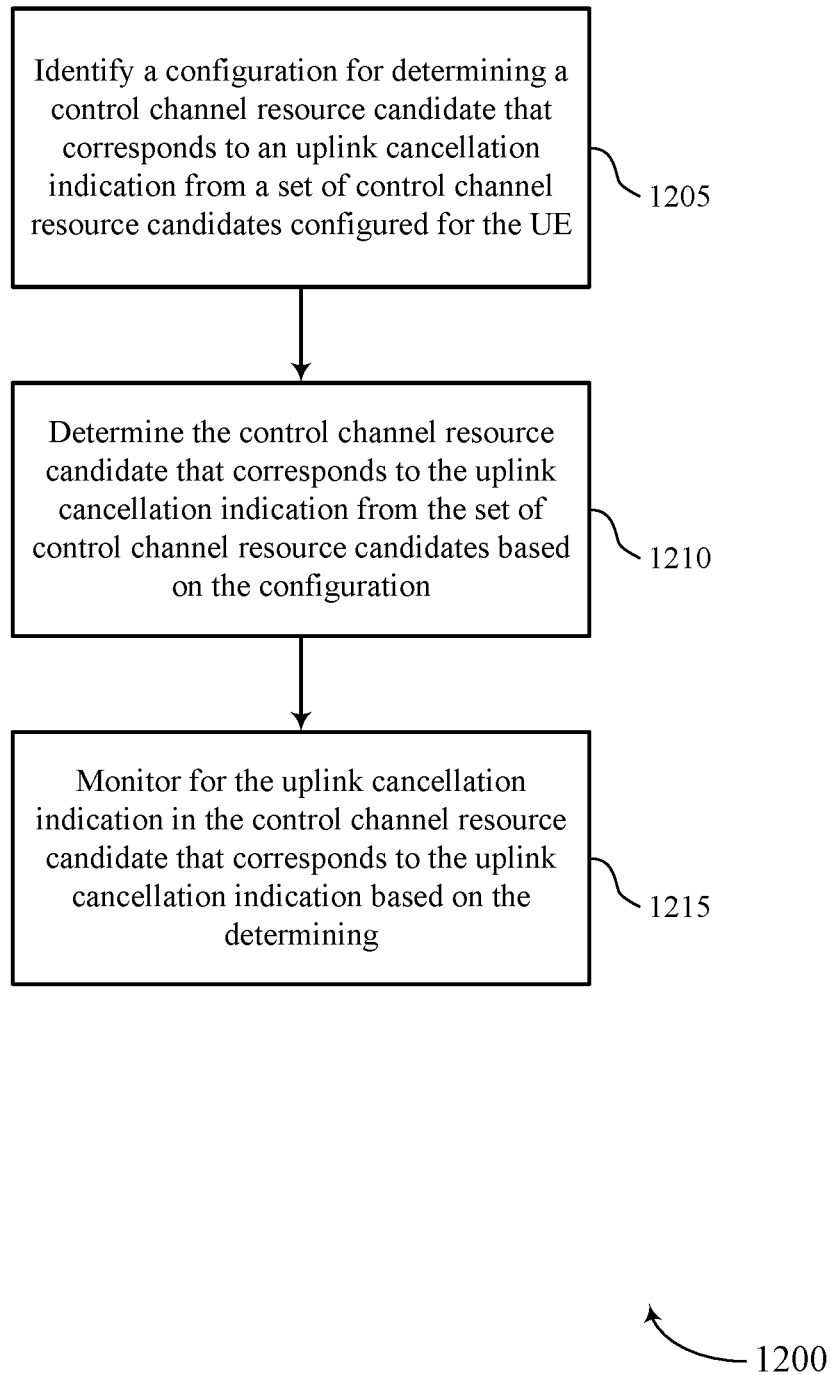
FIGS. 12 through 16 show flowcharts illustrating methods that support uplink cancellation indication resource determination in accordance with aspects of the present disclosure.

FIG. 12 shows a flowchart illustrating a method 1200 that supports uplink cancellation indication resource determination in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may identify a configuration for determining a control channel resource candidate that corresponds to an uplink cancellation indication from a set of control channel resource candidates configured for the UE. The operations of 1205 may be performed according to the methods described herein. In some examples, aspects of the operations of 1205 may be performed by a ULCI configuration component as described with reference to FIGS. 4 through 7.

At 1210, the UE may determine the control channel resource candidate that corresponds to the uplink cancellation indication from the set of control channel resource candidates based on the configuration. The operations of 1210 may be performed according to the methods described herein. In some examples, aspects of the operations of 1210 may be performed by a resource candidate component as described with reference to FIGS. 4 through 7.

At 1215, the UE may monitor for the uplink cancellation indication in the control channel resource candidate that corresponds to the uplink cancellation indication based on the determining. The operations of 1215 may be performed according to the methods described herein. In some examples, aspects of the operations of 1215 may be performed by a monitoring component as described with reference to FIGS. 4 through 7.

Figure 13:
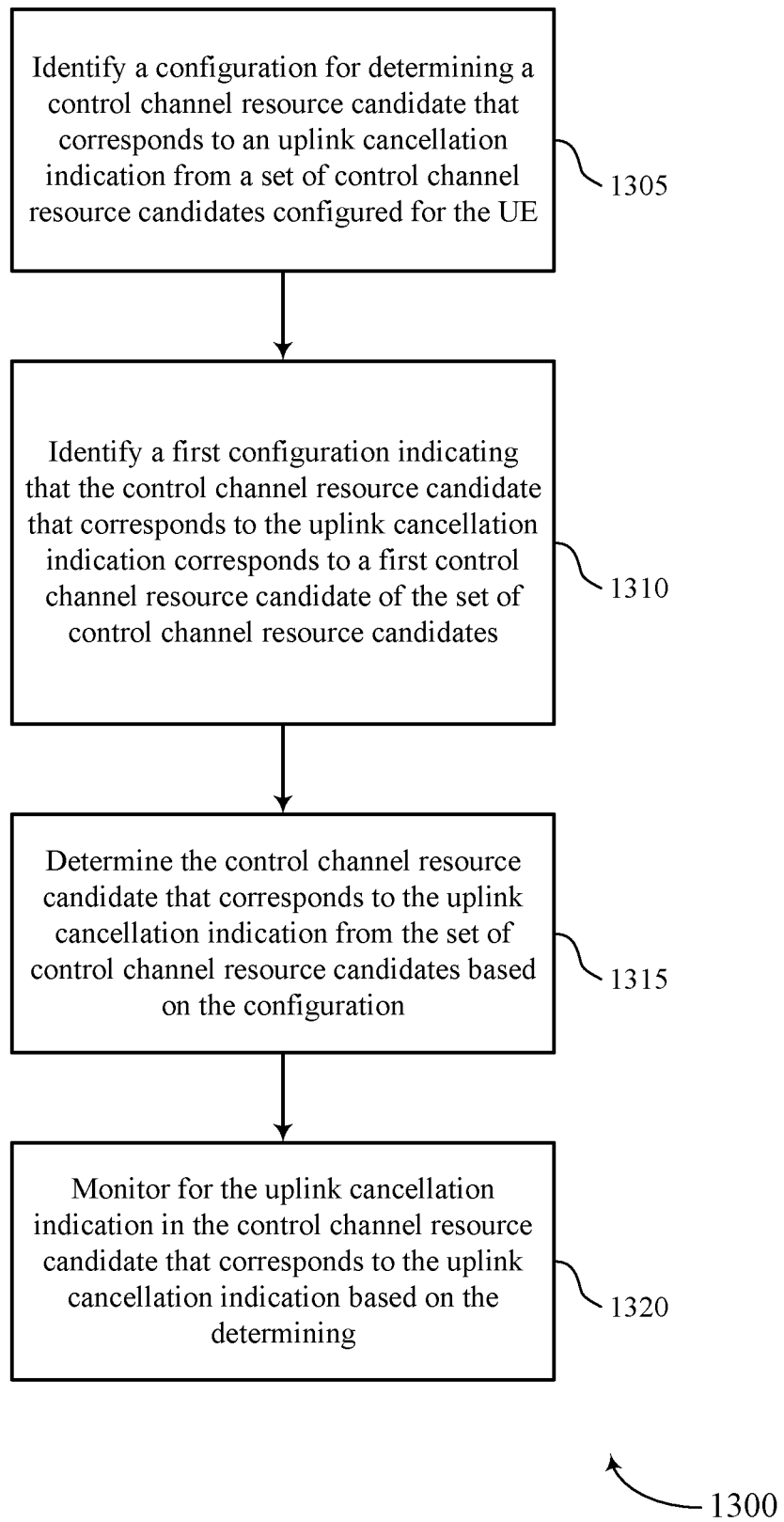

FIG. 13 shows a flowchart illustrating a method 1300 that supports uplink cancellation indication resource determination in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may identify a configuration for determining a control channel resource candidate that corresponds to an uplink cancellation indication from a set of control channel resource candidates configured for the UE. The operations of 1305 may be performed according to the methods described herein. In some examples, aspects of the operations of 1305 may be performed by a ULCI configuration component as described with reference to FIGS. 4 through 7.

At 1310, the UE may identify a first configuration indicating that the control channel resource candidate that corresponds to the uplink cancellation indication corresponds to a first control channel resource candidate of the set of control channel resource candidates. The operations of 1310 may be performed according to the methods described herein. In some examples, aspects of the operations of 1310 may be performed by a ULCI configuration component as described with reference to FIGS. 4 through 7.

At 1315, the UE may determine the control channel resource candidate that corresponds to the uplink cancellation indication from the set of control channel resource candidates based on the configuration. The operations of 1315 may be performed according to the methods described herein. In some examples, aspects of the operations of 1315 may be performed by a resource candidate component as described with reference to FIGS. 4 through 7.

At 1320, the UE may monitor for the uplink cancellation indication in the control channel resource candidate that corresponds to the uplink cancellation indication based on the determining. The operations of 1320 may be performed according to the methods described herein. In some examples, aspects of the operations of 1320 may be performed by a monitoring component as described with reference to FIGS. 4 through 7.

Figure 14:
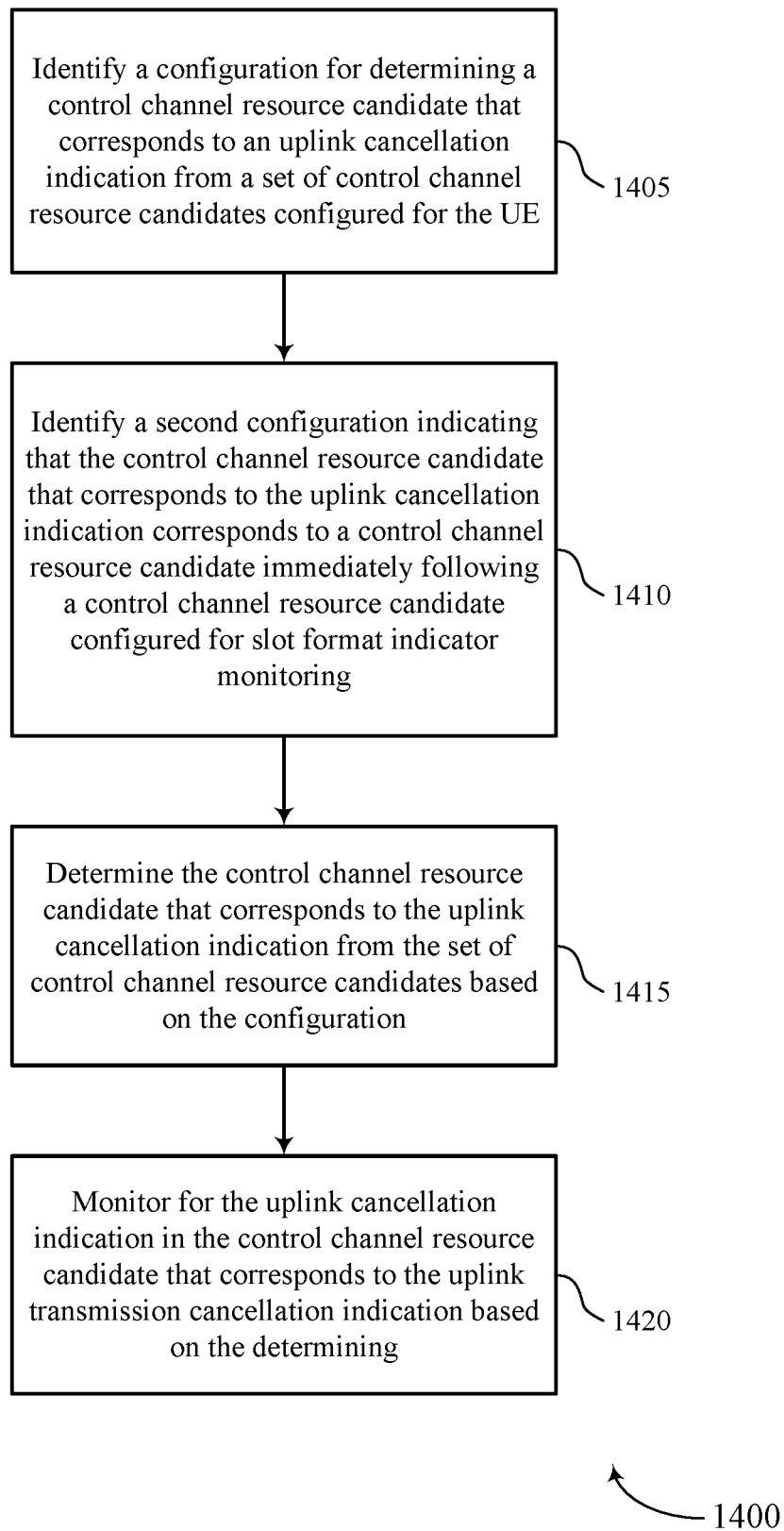

FIG. 14 shows a flowchart illustrating a method 1400 that supports uplink cancellation indication resource determination in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may identify a configuration for determining a control channel resource candidate that corresponds to an uplink cancellation indication from a set of control channel resource candidates configured for the UE. The operations of 1405 may be performed according to the methods described herein. In some examples, aspects of the operations of 1405 may be performed by a ULCI configuration component as described with reference to FIGS. 4 through 7.

At 1410, the UE may identify a second configuration indicating that the control channel resource candidate that corresponds to the uplink cancellation indication corresponds to a control channel resource candidate immediately following a control channel resource candidate configured for slot format indicator monitoring. The operations of 1410 may be performed according to the methods described herein. In some examples, aspects of the operations of 1410 may be performed by a ULCI configuration component as described with reference to FIGS. 4 through 7.

At 1415, the UE may determine the control channel resource candidate that corresponds to the uplink cancellation indication from the set of control channel resource candidates based on the configuration. The operations of 1415 may be performed according to the methods described herein. In some examples, aspects of the operations of 1415 may be performed by a resource candidate component as described with reference to FIGS. 4 through 7.

At 1420, the UE may monitor for the uplink cancellation indication in the control channel resource candidate that corresponds to the uplink cancellation indication based on the determining. The operations of 1420 may be performed according to the methods described herein. In some examples, aspects of the operations of 1420 may be performed by a monitoring component as described with reference to FIGS. 4 through 7.

Figure 15:
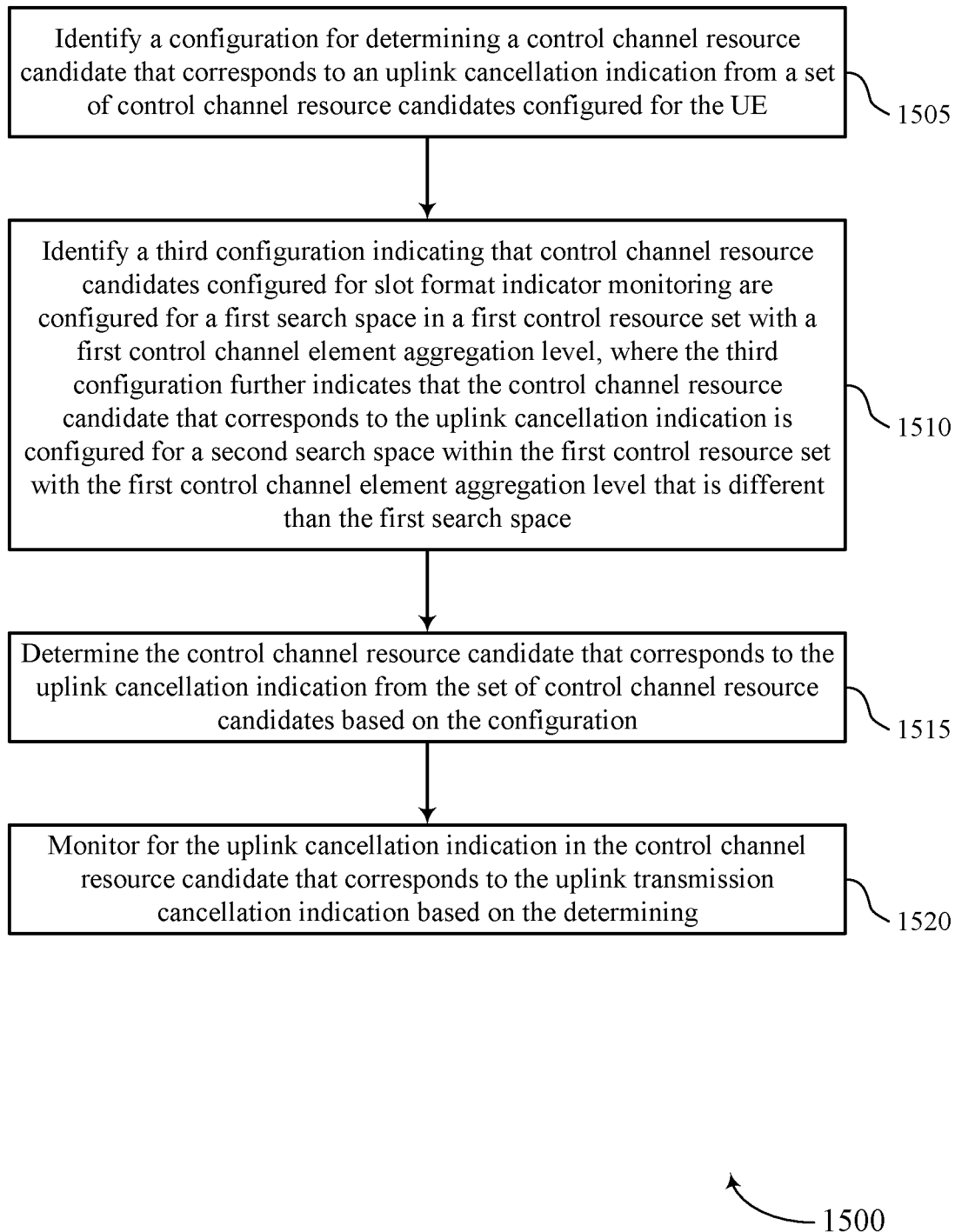

FIG. 15 shows a flowchart illustrating a method 1500 that supports uplink cancellation indication resource determination in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may identify a configuration for determining a control channel resource candidate that corresponds to an uplink cancellation indication from a set of control channel resource candidates configured for the UE. The operations of 1505 may be performed according to the methods described herein. In some examples, aspects of the operations of 1505 may be performed by a ULCI configuration component as described with reference to FIGS. 4 through 7.

At 1510, the UE may identify a second configuration indicating that control channel resource candidates configured for slot format indicator monitoring are configured for a first search space in a first control resource set with a first control channel element aggregation level, where the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level. The operations of 1510 may be performed according to the methods described herein. In some examples, aspects of the operations of 1510 may be performed by a ULCI configuration component as described with reference to FIGS. 4 through 7.

At 1515, the UE may determine the control channel resource candidate that corresponds to the uplink cancellation indication from the set of control channel resource candidates based on the configuration. The operations of 1515 may be performed according to the methods described herein. In some examples, aspects of the operations of 1515 may be performed by a resource candidate component as described with reference to FIGS. 4 through 7.

At 1520, the UE may monitor for the uplink cancellation indication in the control channel resource candidate that corresponds to the uplink cancellation indication based on the determining. The operations of 1520 may be performed according to the methods described herein. In some examples, aspects of the operations of 1520 may be performed by a monitoring component as described with reference to FIGS. 4 through 7.

Figure 16:
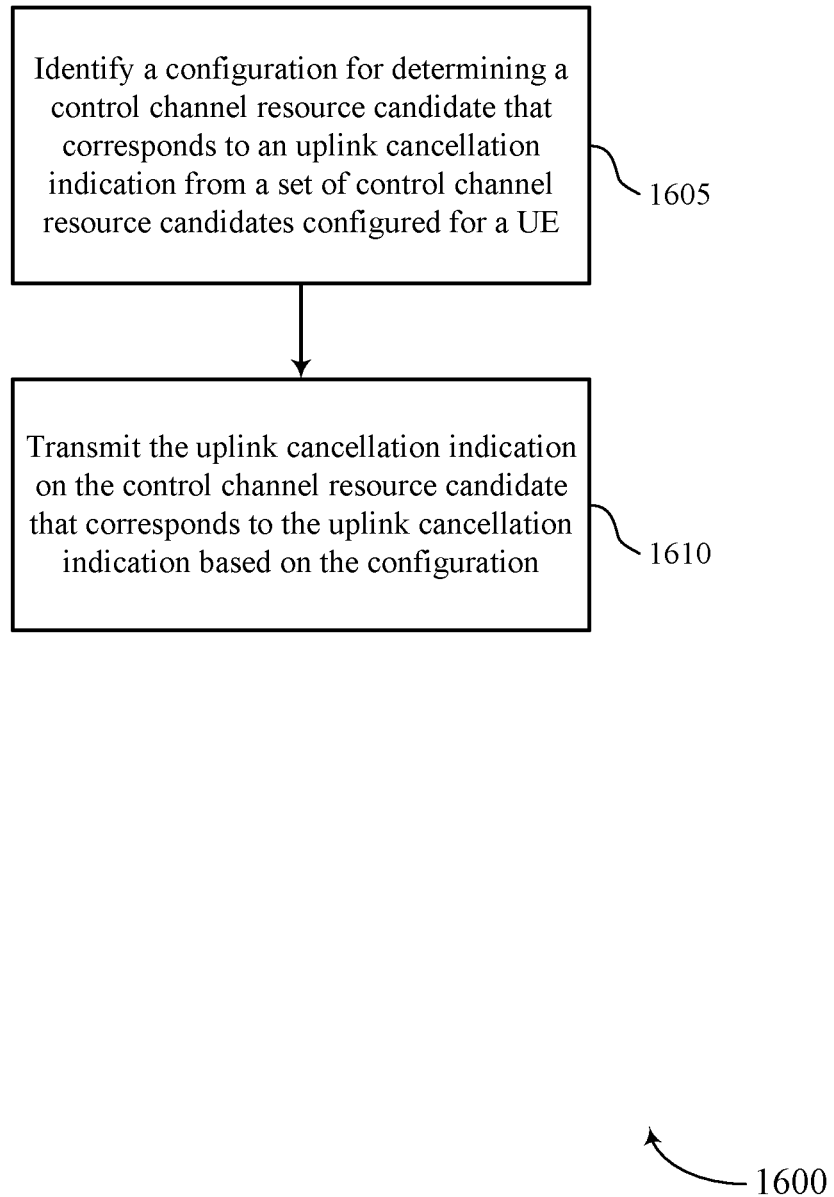

FIG. 16 shows a flowchart illustrating a method 1600 that supports uplink cancellation indication resource determination in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may identify a configuration for determining a control channel resource candidate that corresponds to an uplink cancellation indication from a set of control channel resource candidates configured for a UE. The operations of 1605 may be performed according to the methods described herein. In some examples, aspects of the operations of 1605 may be performed by a ULCI configuration component as described with reference to FIGS. 8 through 11.

At 1610, the base station may transmit the uplink cancellation indication on the control channel resource candidate that corresponds to the uplink cancellation indication based on the configuration. The operations of 1610 may be performed according to the methods described herein. In some examples, aspects of the operations of 1610 may be performed by a ULCI indication component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: identifying a configuration for determining a control channel resource candidate that corresponds to an uplink cancellation indication from a plurality of control channel resource candidates configured for the UE; determining the control channel resource candidate that corresponds to the uplink cancellation indication from the plurality of control channel resource candidates based at least in part on the configuration; and monitoring for the uplink cancellation indication in the control channel resource candidate that corresponds to the uplink cancellation indication based at least in part on the determining.

Aspect 2: The method of aspect 1, wherein identifying the configuration further comprises: identifying a first configuration indicating that the control channel resource candidate that corresponds to the uplink cancellation indication corresponds to a first control channel resource candidate of the plurality of control channel resource candidates.

Aspect 3: The method of aspect 2, further comprising: receiving configuration signaling configuring the UE to monitor a search space in a control resource set with a control channel element aggregation level, wherein the first control channel resource candidate of the plurality of control channel resource candidates corresponds to a first control channel resource candidate for the aggregation level for the search space in the control resource set.

Aspect 4: The method of any of aspects 2 through 3, further comprising: differentiating between the control channel resource candidate that corresponds to the uplink cancellation indication and a control channel resource candidate that corresponds to a slot format indicator based at least in part on a difference in a radio network temporary identifier for the control channel resource candidate that corresponds to the uplink cancellation indication and the control channel resource candidate that corresponds to the slot format indicator.

Aspect 5: The method of any of aspects 1 through 4, wherein identifying the configuration further comprises: identifying a second configuration indicating that control channel resource candidates configured for slot format indicator monitoring are configured for a first search space in a first control resource set with a first control channel element aggregation level, wherein the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

Aspect 6: The method of any of aspects 1 through 5, wherein identifying the configuration further comprises: identifying a third configuration indicating that control channel resource candidates configured for slot format indicator monitoring and the control channel resource candidate that corresponds to the uplink cancellation indication correspond to a different blind detection.

Aspect 7: The method of any of aspects 1 through 6, further comprising: decoding the control channel resource candidate that corresponds to the uplink cancellation indication prior to decoding other control channel resource candidates in a same control channel monitoring occasion as the control channel resource candidate that corresponds to the uplink cancellation indication according to a decoding prioritization rule.

Aspect 8: The method of any of aspects 1 through 7, wherein the control channel resource candidate that corresponds to the uplink cancellation indication corresponds to a physical downlink control channel blind decoding candidate.

Aspect 9: A method for wireless communications at a base station, comprising: identifying a configuration for determining a control channel resource candidate that corresponds to an uplink cancellation indication from a plurality of control channel resource candidates configured for a UE; and transmitting the uplink cancellation indication on the control channel resource candidate that corresponds to the uplink cancellation indication based at least in part on the configuration.

Aspect 10: The method of aspect 9, wherein identifying the configuration further comprises: identifying a first configuration indicating that the control channel resource candidate that corresponds to the uplink cancellation indication corresponds to a first control channel resource candidate of the plurality of control channel resource candidates.

Aspect 11: The method of aspect 10, further comprising: transmitting configuration signaling configuring the UE to monitor a search space in a control resource set with a control channel element aggregation level, wherein the first control channel resource candidate of the plurality of control channel resource candidates corresponds to a first control channel resource candidate for the aggregation level for the search space in the control resource set.

Aspect 12: The method of any of aspects 10 through 11, further comprising: differentiating between the control channel resource candidate that corresponds to the uplink cancellation indication and a control channel resource candidate that corresponds to a slot format indicator based at least in part on a difference in a radio network temporary identifier for the control channel resource candidate that corresponds to the uplink cancellation indication and the control channel resource candidate that corresponds to the slot format indicator.

Aspect 13: The method of any of aspects 9 through 12, wherein identifying the configuration further comprises: identifying a second configuration indicating that control channel resource candidates configured for slot format indicator monitoring are configured for a first search space in a first control resource set with a first control channel element aggregation level, wherein the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

Aspect 14: The method of any of aspects 9 through 13, wherein identifying the configuration further comprises: identifying a third configuration indicating that control channel resource candidates configured for slot format indicator monitoring and the control channel resource candidate that corresponds to the uplink cancellation indication correspond to a different blind detection.

Aspect 15: The method of any of aspects 9 through 14, further comprising: transmitting configuration signaling indicating the configuration to the UE.

Aspect 16: The method of any of aspects 9 through 15, wherein the control channel resource candidate that corresponds to the uplink cancellation indication corresponds to a physical downlink control channel blind decoding candidate.

Aspect 17: An apparatus for wireless communications at a UE, comprising a processor; memory coupled with the processor; and instructions stored in the memory and executable by the processor to cause the apparatus to perform a method of any of aspects 1 through 8.

Aspect 18: An apparatus for wireless communications at a UE, comprising at least one means for performing a method of any of aspects 1 through 8.

Aspect 19: A non-transitory computer-readable medium storing code for wireless communications at a UE, the code comprising instructions executable by a processor to perform a method of any of aspects 1 through 8.

Aspect 20: An apparatus for wireless communications at a base station, comprising a processor; memory coupled with the processor; and instructions stored in the memory and executable by the processor to cause the apparatus to perform a method of any of aspects 9 through 16.

Aspect 21: An apparatus for wireless communications at a base station, comprising at least one means for performing a method of any of aspects 9 through 16.

Aspect 22: A non-transitory computer-readable medium storing code for wireless communications at a base station, the code comprising instructions executable by a processor to perform a method of any of aspects 9 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more memories; and
   one or more processors coupled with the one or more memories and configured to:
      receive a downlink control information message conveyed in a control channel resource candidate from a plurality of control channel resource candidates located in a search space of a control resource set configured for the UE, wherein the downlink control information message is associated with a first radio network temporary identifier which indicates that the control channel resource candidate corresponds to an uplink cancellation indication that cancels one or more uplink communications, wherein the plurality of control channel resource candidates are for a control channel element aggregation level that is associated with uplink cancellation indication monitoring;
      determine, based on the downlink control information message and the first radio network temporary identifier, that the control channel resource candidate corresponding to the uplink cancellation indication is located at a monitoring location of the plurality of control channel resource candidates in the control resource set, wherein the monitoring location is a monitoring location that is located first in time of the plurality of control channel resource candidates for the control channel element aggregation level associated with uplink cancellation indication monitoring; and
      monitor for the uplink cancellation indication in the monitoring location of the plurality of control channel resource candidates based at least in part on the determining.

2. The apparatus of claim 1, wherein the one or more processors are further configured to:
   receive configuration signaling configuring the UE to monitor the search space in the control resource set with the control channel element aggregation level associated with cancellation indication monitoring, wherein a sequentially first control channel resource candidate of the plurality of control channel resource candidates corresponds to the sequentially first control channel resource candidate for the control channel element aggregation level for the search space in the control resource set.

3. The apparatus of claim 1, wherein the one or more processors are further configured to:
   differentiate between the control channel resource candidate that corresponds to the uplink cancellation indication and a second control channel resource candidate that corresponds to a slot format indicator based at least in part on a difference in the first radio network temporary identifier for the control channel resource candidate that corresponds to the uplink cancellation indication and a second radio network temporary identifier for the control channel resource candidate that corresponds to the slot format indicator.

4. The apparatus of claim 1, wherein the search space comprises a first search space and the control resource set comprises a first control resource set and the one or more processors are further configured to:
   receive a second configuration indicating that control channel resource candidates configured for slot format indicator monitoring are configured for the first search space in the first control resource set with a first control channel element aggregation level, wherein the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

5. The apparatus of claim 1, wherein the one or more processors are further configured to:
   receive a third configuration indicating that control channel resource candidates configured for slot format indicator monitoring and the control channel resource candidate that corresponds to the uplink cancellation indication correspond to a different blind detection.

6. The apparatus of claim 1, wherein the one or more processors are further configured to:
   decode the control channel resource candidate that corresponds to the uplink cancellation indication prior to decoding other control channel resource candidates in a same control channel monitoring occasion as the control channel resource candidate that corresponds to the uplink cancellation indication according to a decoding prioritization rule.

7. The apparatus of claim 1, wherein the control channel resource candidate that corresponds to the uplink cancellation indication corresponds to a physical downlink control channel blind decoding candidate.

8. The apparatus of claim 1, wherein the one or more processors are further configured to:
   transmit an indication of a downlink processing time capability of the UE to process one or more downlink communications at the UE.

9. An apparatus for wireless communications at a network device, comprising:
   one or more memories; and
   one or more processors coupled with the one or more memories and configured to:
      transmit a downlink control information message conveyed in a control channel resource candidate from a plurality of control channel resource candidates located in a search space of a control resource set configured for a user equipment (UE), wherein the downlink control information message is associated with a first radio network temporary identifier which indicates that the control channel resource candidate corresponds to an uplink cancellation indication that cancels one or more uplink communications, wherein the plurality of control channel resource candidates are for a control channel element aggregation level that is associated with uplink cancellation indication monitoring; and transmit the uplink cancellation indication on the control channel resource candidate that is located at a monitoring location of the plurality of control channel resource candidates in the control resource set based on the downlink control information message, wherein the monitoring location is a monitoring location that is located first in time of the plurality of control channel resource candidates for the control channel element aggregation level associated with uplink cancellation indication monitoring.

10. The apparatus of claim 9, wherein the one or more processors are further configured to:

transmit configuration signaling configuring the UE to monitor the search space in the control resource set with the control channel element aggregation level associated with cancelation indication monitoring, wherein a sequentially first control channel resource candidate of the plurality of control channel resource candidates corresponds to the sequentially first control channel resource candidate for the control channel element aggregation level for the search space in the control resource set.

11. The apparatus of claim 9, wherein the one or more processors are further configured to:

differentiate between the control channel resource candidate that corresponds to the uplink cancellation indication and a second control channel resource candidate that corresponds to a slot format indicator based at least in part on a difference in the first radio network temporary identifier for the control channel resource candidate that corresponds to the uplink cancellation indication and a second radio network temporary identifier for the control channel resource candidate that corresponds to the slot format indicator.

12. The apparatus of claim 9, wherein the search space comprises a first search space and the control resource set comprises a first control resource set and the one or more processors are further configured to:

transmit a second configuration indicating that control channel resource candidates configured for slot format indicator monitoring are configured for the first search space in the first control resource set with a first control channel element aggregation level, wherein the second configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

13. The apparatus of claim 9, wherein the one or more processors are further configured to:

transmit a third configuration indicating that control channel resource candidates configured for slot format indicator monitoring and the control channel resource candidate that corresponds to the uplink cancellation indication correspond to a different blind detection.

14. The apparatus of claim 9, wherein the one or more processors are further configured to:

receive an indication of a downlink processing time capability of the UE to process one or more downlink communications at the UE.

15. A method for wireless communications at a user equipment (UE), comprising:

receiving a downlink control information message conveyed in a control channel resource candidate from a plurality of control channel resource candidates located in a search space of a control resource set configured for the UE, wherein the downlink control information message is associated with a first radio network temporary identifier which indicates that the control channel resource candidate corresponds to an uplink cancellation indication that cancels one or more uplink communications, wherein the plurality of control channel resource candidates are for a control channel element aggregation level that is associated with uplink cancellation indication monitoring;

determining, based on the downlink control information message and the first radio network temporary identifier, that the control channel resource candidate corresponding to the uplink cancellation indication is located at a monitoring location of the plurality of control channel resource candidates in the control resource set, wherein the monitoring location is a monitoring location that is located first in time of the plurality of control channel resource candidates for the control channel element aggregation level associated with uplink cancellation indication monitoring; and monitoring for the uplink cancellation indication in the monitoring location of the plurality of control channel resource candidates based at least in part on the determining.

16. The method of claim 15, further comprising:

receiving configuration signaling configuring the UE to monitor the search space in the control resource set with the control channel element aggregation level associated with cancelation indication monitoring, wherein a sequentially first control channel resource candidate of the plurality of control channel resource candidates corresponds to the sequentially first control channel resource candidate for the control channel element aggregation level for the search space in the control resource set.

17. The method of claim 15, further comprising:

differentiating between the control channel resource candidate that corresponds to the uplink cancellation indication and a second control channel resource candidate that corresponds to a slot format indicator based at least in part on a difference in the first radio network temporary identifier for the control channel resource candidate that corresponds to the uplink cancellation indication and a second radio network temporary identifier for the control channel resource candidate that corresponds to the slot format indicator.

18. The method of claim 15, wherein the search space comprises a first search space and the control resource set comprises a first control resource set and receiving the downlink control information message comprises:

receiving an indication of a configuration indicating that control channel resource candidates configured for slot format indicator monitoring are configured for the first search space in the first control resource set with a first control channel element aggregation level, wherein the configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

19. The method of claim 15, wherein receiving the downlink control information message comprises:
receiving an indication of a configuration indicating that control channel resource candidates configured for slot format indicator monitoring and the control channel resource candidate that corresponds to the uplink cancellation indication correspond to a different blind detection.

20. The method of claim 15, further comprising:
decoding the control channel resource candidate that corresponds to the uplink cancellation indication prior to decoding other control channel resource candidates in a same control channel monitoring occasion as the control channel resource candidate that corresponds to the uplink cancellation indication according to a decoding prioritization rule.

21. The method of claim 15, wherein the control channel resource candidate that corresponds to the uplink cancellation indication corresponds to a physical downlink control channel blind decoding candidate.

22. The method of claim 15, further comprising:
transmitting an indication of a downlink processing time capability of the UE to process one or more downlink communications at the UE.

23. A method for wireless communications at a network device, comprising:
transmitting a downlink control information message conveyed in a control channel resource candidate from a plurality of control channel resource candidates located in a search space of a control resource set configured for a user equipment (UE), wherein the downlink control information message is associated with a first radio network temporary identifier which indicates that the control channel resource candidate corresponds to an uplink cancellation indication that cancels one or more uplink communications, wherein the plurality of control channel resource candidates are for a control channel element aggregation level that is associated with uplink cancellation indication monitoring; and
transmitting the uplink cancellation indication on the control channel resource candidate that is located at a monitoring location of the plurality of control channel resource candidates in the control resource set based on the downlink control information message, wherein the monitoring location is a monitoring location that is located first in time of the plurality of control channel resource candidates for the control channel element aggregation level associated with uplink cancellation indication monitoring.

24. The method of claim 23, further comprising:
transmitting configuration signaling configuring the UE to monitor the search space in the control resource set with the control channel element aggregation level associated with cancellation indication monitoring, wherein a sequentially first control channel resource candidate of the plurality of control channel resource candidates corresponds to the sequentially first control channel resource candidate for the control channel element aggregation level for the search space in the control resource set.

25. The method of claim 24, further comprising:
differentiating between the control channel resource candidate that corresponds to the uplink cancellation indication and a second control channel resource candidate that corresponds to a slot format indicator based at least in part on a difference in the first radio network temporary identifier for the control channel resource candidate that corresponds to the uplink cancellation indication and a second radio network temporary identifier for the control channel resource candidate that corresponds to the slot format indicator.

26. The method of claim 23, wherein the search space comprises a first search space and the control resource set comprises a first control resource set and transmitting the downlink control information message comprises:
transmitting an indication of a configuration indicating that control channel resource candidates configured for slot format indicator monitoring are configured for the first search space in the first control resource set with a first control channel element aggregation level, wherein the configuration further indicates that the control channel resource candidate that corresponds to the uplink cancellation indication is configured for a second search space, a second control resource set, a second control channel element aggregation level, or a combination thereof, that is different than the first search space, the first control resource set, and the first control channel element aggregation level.

27. The method of claim 23, wherein transmitting the downlink control information message comprises:
transmitting an indication of a configuration indicating that control channel resource candidates configured for slot format indicator monitoring and the control channel resource candidate that corresponds to the uplink cancellation indication correspond to a different blind detection.

28. The method of claim 23, further comprising:
transmitting configuration signaling comprising the downlink control information message.

29. The method of claim 23, wherein the control channel resource candidate that corresponds to the uplink cancellation indication corresponds to a physical downlink control channel blind decoding candidate.

30. The method of claim 23, further comprising:
receiving an indication of a downlink processing time capability of the UE to process one or more downlink communications at the UE.

* * * * *